US011398226B1

(12) United States Patent
Wang et al.

(10) Patent No.: US 11,398,226 B1
(45) Date of Patent: Jul. 26, 2022

(54) COMPLEX NATURAL LANGUAGE PROCESSING

(71) Applicant: Amazon Technologies, Inc., Seattle, WA (US)

(72) Inventors: Han Wang, Braintree, MA (US); Tong Wang, Fall River, MA (US); Yue Liu, Belmont, MA (US); Ashish Kumar Agrawal, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 16/943,499

(22) Filed: Jul. 30, 2020

(51) Int. Cl.
*G10L 15/18* (2013.01)
*G10L 15/26* (2006.01)

(52) U.S. Cl.
CPC ...... *G10L 15/1815* (2013.01); *G10L 15/1822* (2013.01); *G10L 15/26* (2013.01)

(58) Field of Classification Search
CPC .. G10L 15/1815; G10L 15/1822; G10L 15/26
See application file for complete search history.

(56) References Cited

U.S. PATENT DOCUMENTS

2019/0266281 A1* 8/2019 Van Der Stockt .... G06F 16/335
2021/0304773 A1* 9/2021 Kumar .................... G06F 3/167

* cited by examiner

*Primary Examiner* — Huyen X Vo
*Assistant Examiner* — Darioush Agahi
(74) *Attorney, Agent, or Firm* — Pierce Atwood LLP

(57) ABSTRACT

Techniques for processing complex natural language inputs are described. A complex natural language input may be semantically tagged and parsed to identify individual clauses in the complex natural language input. An execution graph may be generated to represent the clauses and their dependencies. Nodes of the execution graph may be processed using NLU processing and/or a knowledge graph or other information storage and retrieval techniques, and results of such processing may be used to update clause variables with specific entities in the execution graph.

20 Claims, 19 Drawing Sheets

FIG. 8

Node Table
Node adfds
- Value: latest album by [artist name]
- Output Connection Identifier(s):5d5d3

Node jkj
- Value: title song of latest album
- Input Connection Identifier(s):5d5d3
- Output Connection Identifier(s): 92d83

Node gf55
- Value: what is the title song
- Input Connection Identifier(s):92d83

Connections Table
Connection 5d5d3
- Value: latest album title
- Outputting Node: adfds
- Inputting Node: jkj Connection 92d83
- Value: title song title
- Outputting Node: jkj
- Inputting Node: gf55

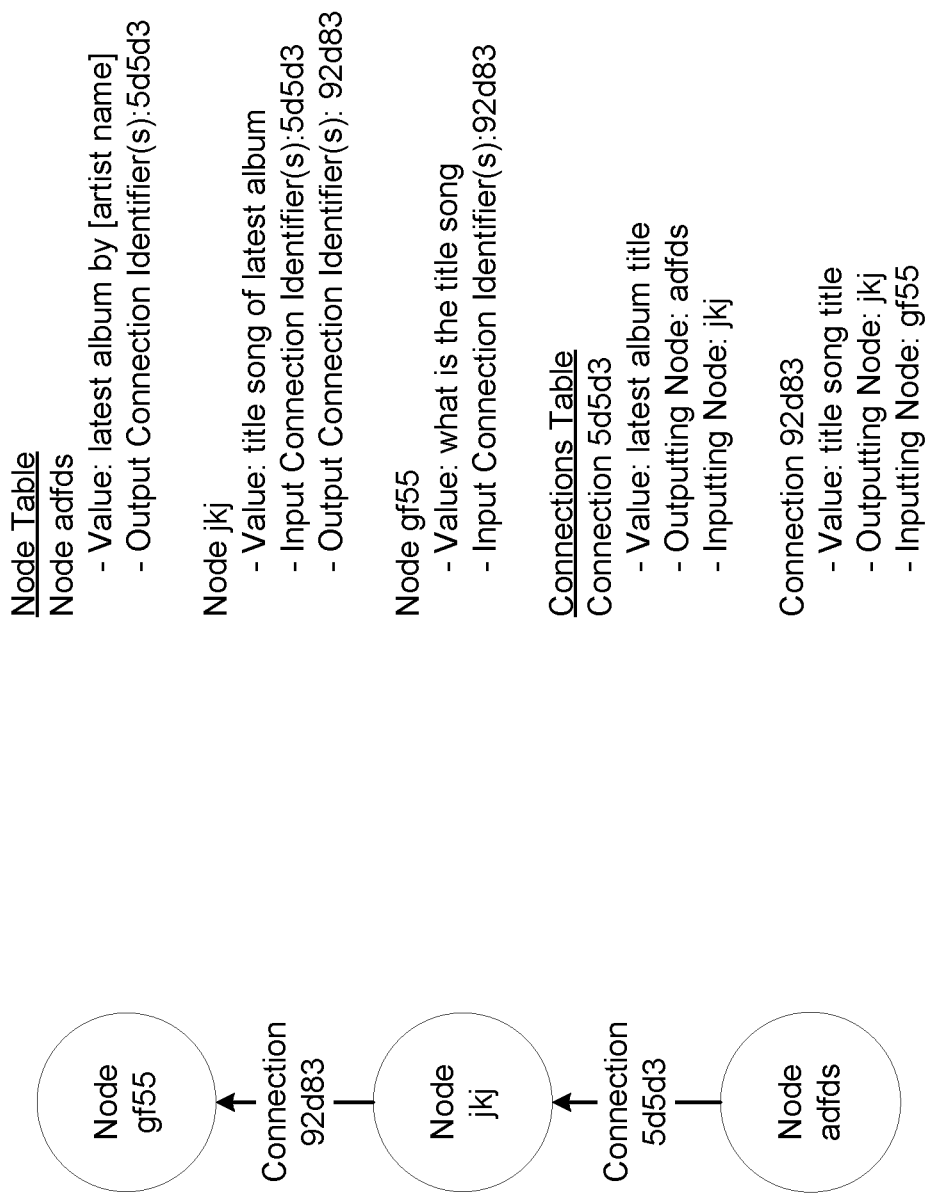

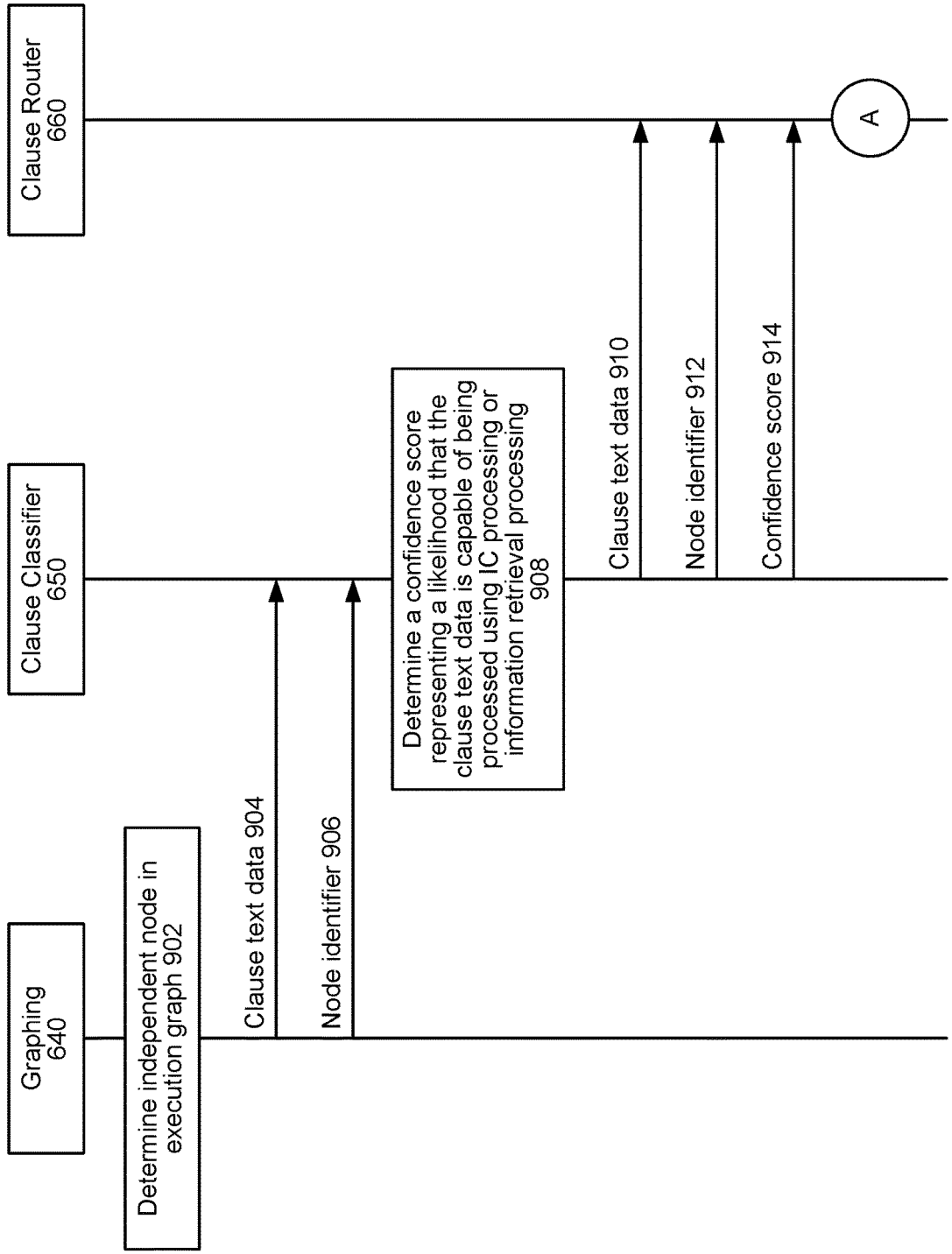

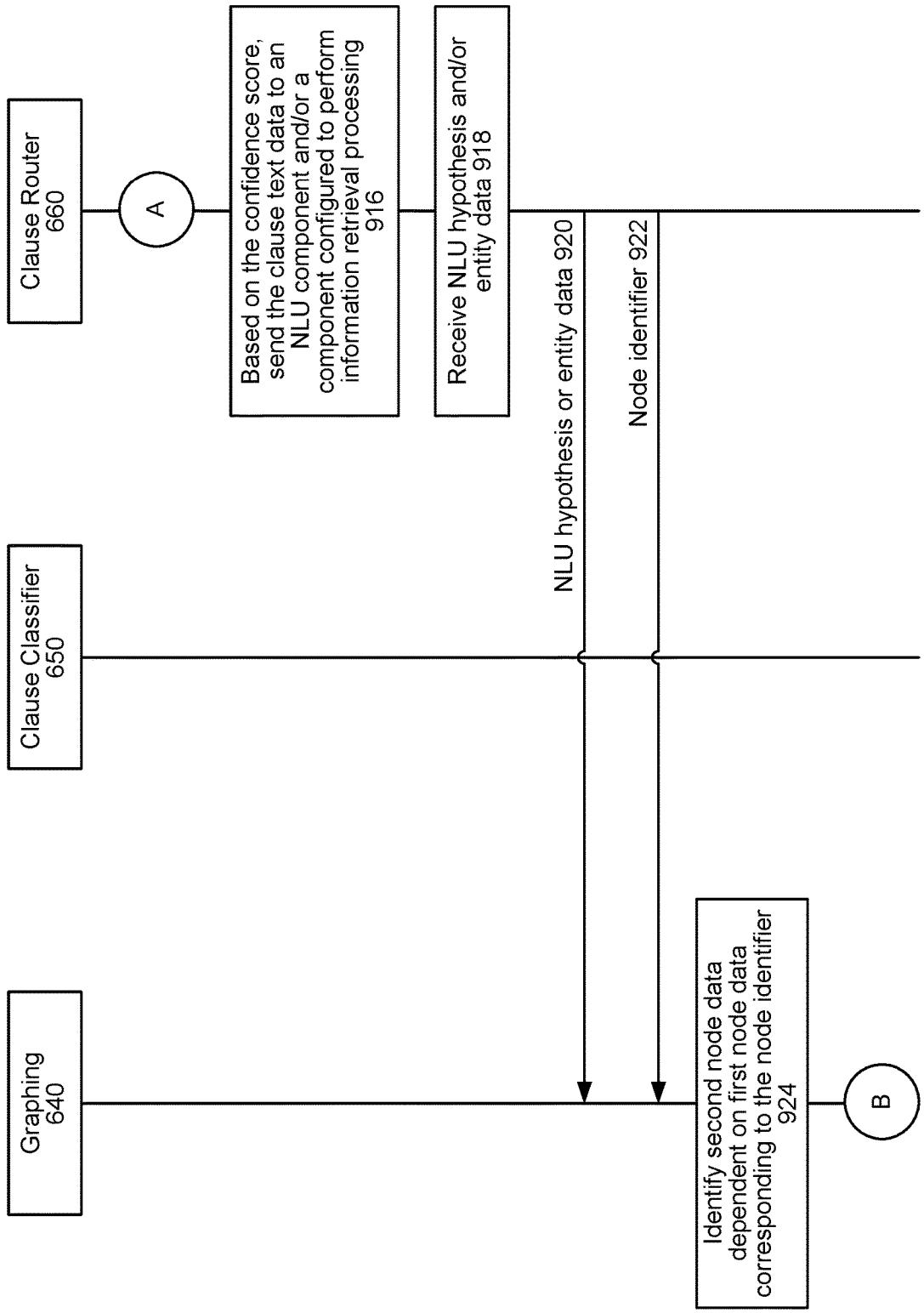

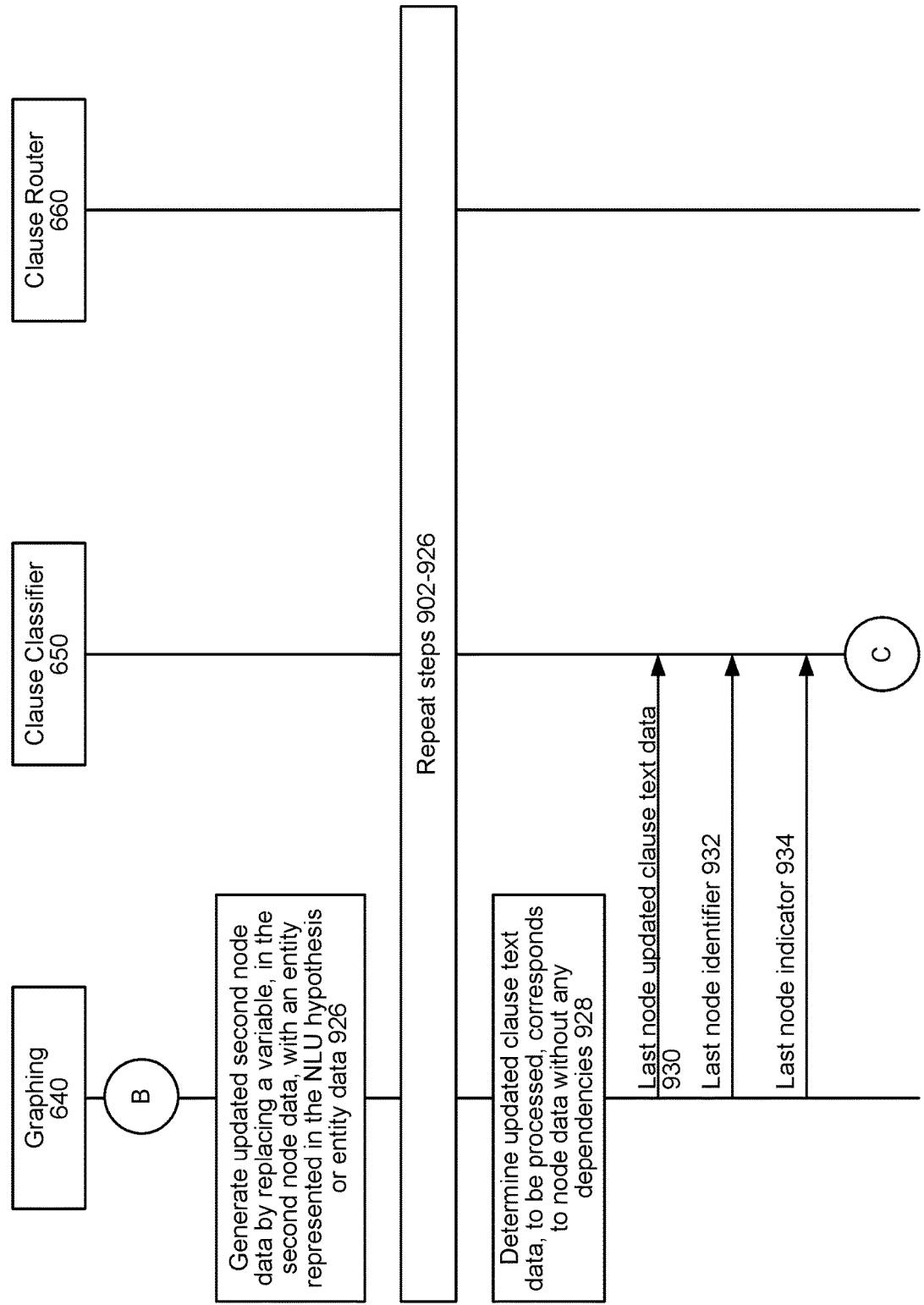

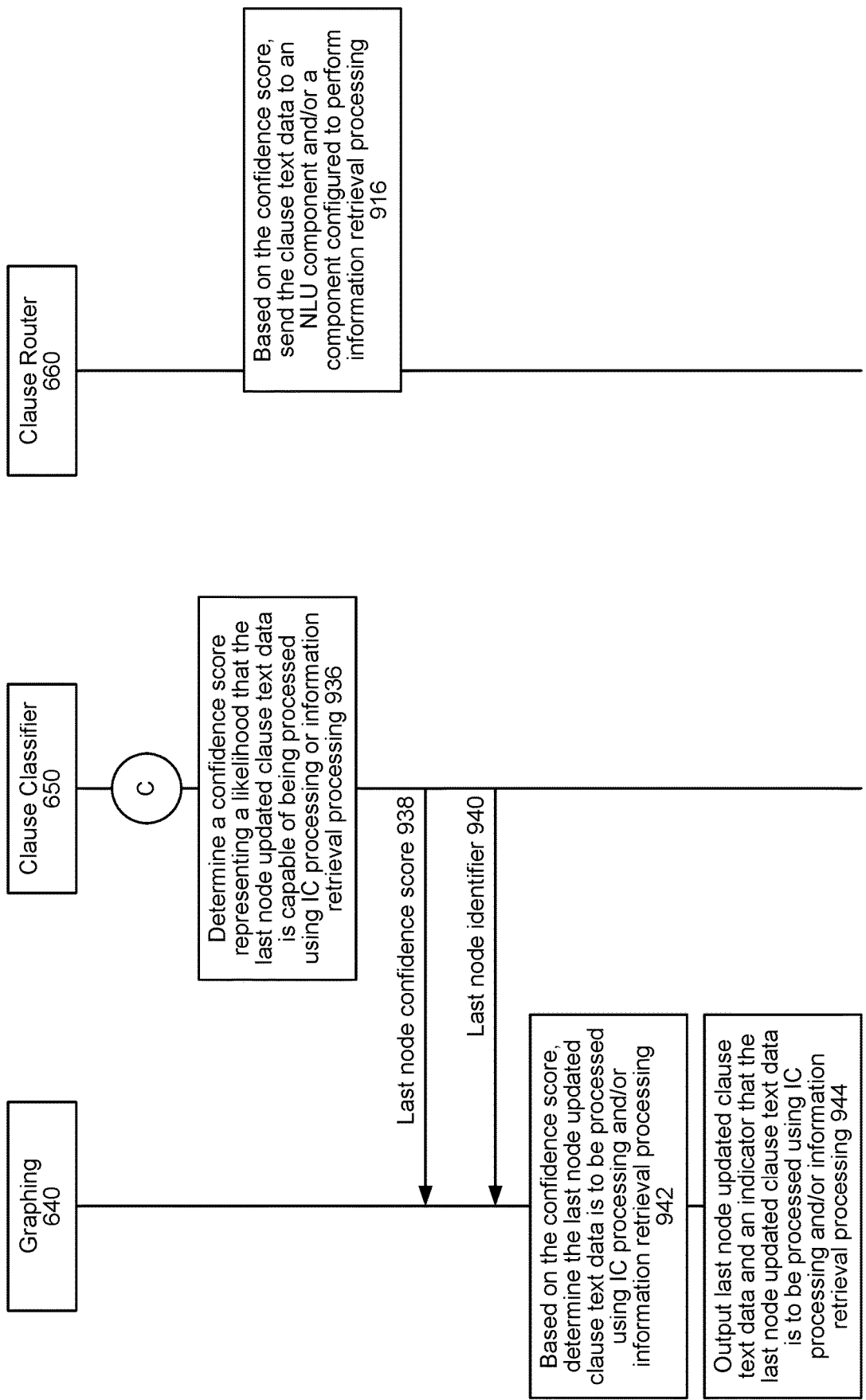

FIG. 12
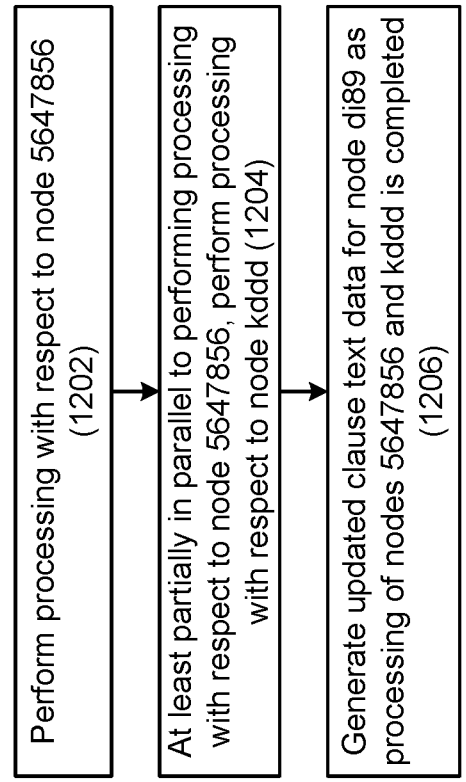
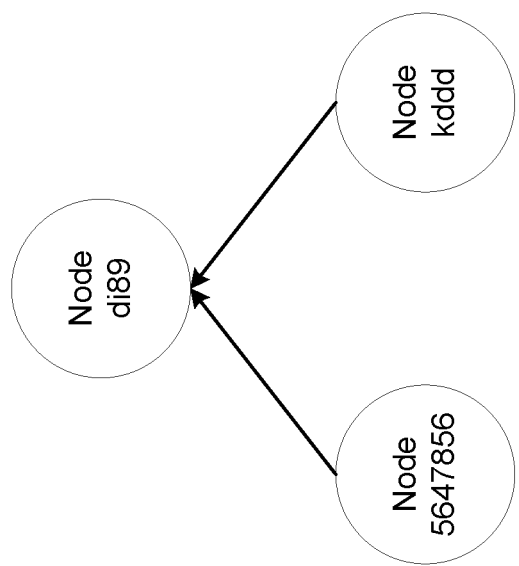

COMPLEX NATURAL LANGUAGE PROCESSING

BACKGROUND

Natural language processing systems have progressed to the point where humans can interact with computing devices using their voices and natural language textual inputs. Such systems employ techniques to identify the words spoken or typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 8 is a conceptual diagram of another example execution graph and corresponding node and connection data, according to embodiments of the present disclosure.

FIGS. 9A-9D are a signal flow diagram illustrating example runtime processes of components of a complex natural language input component, according to embodiments of the present disclosure.

FIG. 12 is a conceptual diagram of an execution graph representing a complex natural language input, and a process flow representing an order of processing with respect to the execution graph, according to embodiments of the present disclosure.

DETAILED DESCRIPTION

Figure 1:
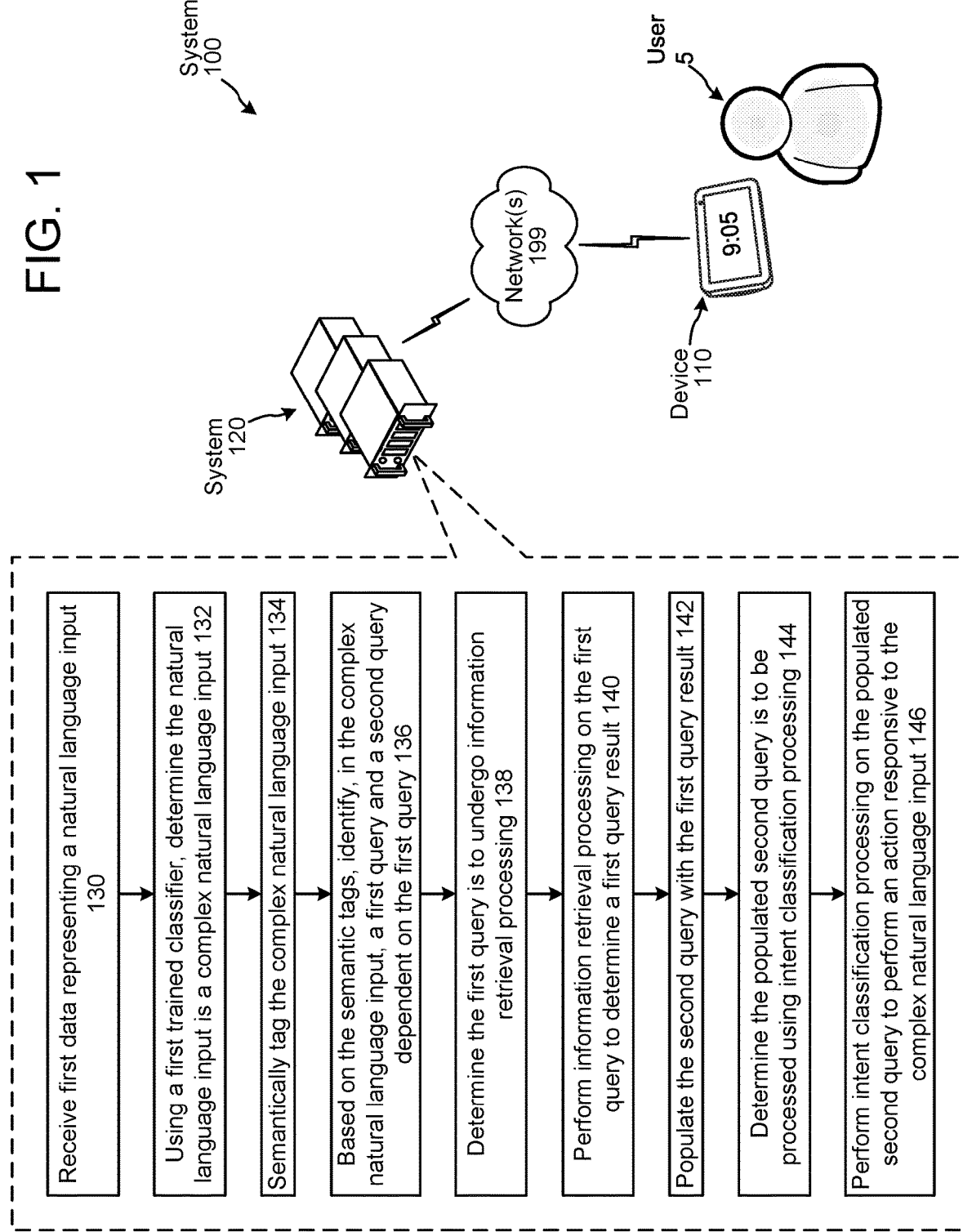
FIG. 1 is a conceptual diagram illustrating a system configured to selectively process a complex natural language input using intent classification (IC) processing and/or information retrieval processing, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may be configured to cause actions to be performed in response to natural language user inputs (e.g., spoken and/or text-based natural language inputs). For example, for the natural language input "play workout music," a system may output music from a user's workout playlist. For further example, for the natural language input "turn on the lights," a system may turn on "smart" lights associated with a user's profile. In another example, for the natural language input "what is the mascot of the Seattle football team," a system may output synthesized speech (and/or display text) corresponding to "the Seahawk." In the foregoing examples, actions correspond to the outputting of music, the turning on of "smart" lights, and the outputting of the synthesized speech/display of text. Thus, as used herein, an "action" may refer to a result of a system processing a natural language input.

A system may be configured to perform NLU processing to determine an intent representing a natural language input (i.e., intent classification (IC) processing), and one or more portions of the natural language input that enable the intent to be carried out. For example, for the natural language input "play [song name] by [artist name]," the system may determine the natural language input corresponds to a "Play Music" intent, may determine "[song name]" is a song title, and may determine "[artist name]" is an artist name. Based on such determinations, the system may identify audio data corresponding to the song title "[song name]" and the artist name "[artist name]," and may output the audio data as audio to the user. NLU processing may be configured to handle transactional-based natural language inputs that request performance of an action, instead of merely requesting an answer to a question contained in the natural language input.

A system may also be configured to perform information retrieval processing to determine an answer to a question contained in a natural language input. For example, for the natural language input "what is the football team in Seattle," the system may use a knowledge base, internet search, and/or other information storage and retrieval techniques to determine an answer responsive to the natural language input as being "the Seahawks" (which the system may output to the user as synthesized speech and/or displayed text). Information retrieval processing may be configured to handle informational natural language inputs that request an answer to a question contained in the natural language input. Example information retrieval processing includes a question and answering (Q&A) component or skill of a system retrieving entity data from a knowledge base, a Q&A component or skill conducting a natural language search using a (e.g., internet) search engine, a skill being queried to provide information responsive to at least a portion of a natural language input (e.g., where the skill-provided information may correspond to historical information received by, stored by, and/or output by the skill with respect to at least one prior natural language input of the same user), etc.

Some systems may process a natural language input using both IC and information retrieval processing. For example, some systems may perform IC and information retrieval processing of a natural language input, in parallel, and may use an outcome of either the IC or information retrieval processing for performing an action responsive to the natural language input.

The present disclosure provides, among other things, techniques for selectively performing IC and/or information retrieval processing of a complex natural language input. As used herein, a "complex natural language input" refers to a natural language input that can be divided into multiple queries that are capable of being resolved individually (i.e. separate from the other queries/portions of the complex natural language input). For example, a complex natural language input may include a first portion that is capable of being processed using information retrieval processing, and a second portion that is capable of being processed using IC processing. An example complex natural language input is "play that new movie with [actor/actress name] and the aliens." For this complex natural language input, information retrieval processing may be used to determine a movie title corresponding to a movie with the [actor/actress name] and of a science fiction/extraterrestrial genre, and IC processing may be used to determine that multimedia data corresponding to the movie title is to be output to the user. Another example complex natural language input is "play the title song of the latest album by [artist name]." For this complex natural language input, information retrieval processing may be used to determine a song title of a song on the most recent album by the artist represented in the complex natural language input, and IC processing may be used to determine that audio data corresponding to the song name is to be output to the user.

According to embodiments of the present disclosure, a system may implement a machine learning model (e.g., a classifier) that processes a natural language input to determine whether the natural language input is a complex natural language input. If the natural language input is determined to be a complex natural language input, the system may break up the natural language input into individual queries, and determine (with respect to each query) whether the query is to be processed using IC processing or information retrieval processing. The system may then selectively process each query corresponding to the complex natural language input, using IC processing and/or information retrieval processing as appropriate, until the system is able to perform an action responsive to the complex natural language input.

Teachings of the present disclosure provide, among other things, a beneficial user experience. For example, the teachings herein permit a user to provide complex natural language inputs without conforming to a specific structure (which may otherwise be required by a system to correctly process the natural language input).

FIG. 1 illustrates a system 100 configured to selectively process a complex natural language input using IC processing and/or information retrieval processing. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5) in communication with a system 120 across one or more networks 199. The network(s) 199 may include a local or private network or may include a wide network such as the Internet. While the user 5 is illustrated as a human, other types of users (e.g., computing systems) may exist.

The device 110 may receive audio corresponding to a spoken natural language input from the user 5. The device 110 may generate audio data representing the audio, and may send the audio data to the system 120. Alternatively, the device 110 may receive a text-based (e.g., typed) natural language input from the user 5. The device 110 may generate text data representing the text-based natural language input, and may send the text data to the system 120. Alternatively, the device 110 may include (or otherwise be associated with) a camera that captures a sequence of images representing the user 5 performing a gesture. In these instances, the device 110 may send image data (representing the sequence of images) and/or an indication of the gesture performed to the system 120 (and the system 120 may determine stored data representing the gesture corresponds to a particular natural language input). Alternatively, the device 110 may include (or otherwise be associated with) a motion sensor configured to detect motion. When the device 110 detects motion, the device 110 may send data representing the detected motion to the system 120 (and the system 120 may determine stored data representing activation of the motion sensor corresponds to a particular natural language input). Alternatively, the device 110 may include a button or display a virtual button, and the device 110 may detect the user 5 interacting with the button in a particular manner (e.g., a single quick press, a single long press, a double tap, a roaming touch input in a particular direction, etc.). The device 110 may send data representing the detected button interaction to the system 120 (and the system may determine data representing the particular button interaction corresponds to a particular natural language input).

The system 120 receives (130) first data representing a natural language input. For example, the system 120 may receive audio data representing a spoken natural language input, text data representing the text-based natural language input, image data representing the performance of a gesture, motion sensor data representing detected motion, or data representing interaction with/selection of a button. As described above, when the system 120 receives the image data, motion sensor data, or data representing interaction with/selection of a button, the system 120 may determine stored data (first data) representing the received data corresponds to a particular natural language input.

The system 120 may use a first trained classifier to determine (132) the natural language input is a complex natural language input. The first classifier may be trained using examples of complex natural language inputs (that each correspond to multiple individual queries), and examples of non-complex natural language inputs (that each correspond to a single query, such as "what is the weather today," "turn on my first plug," "play my workout playlist," "who was the second president of the United States," etc.).

After the first classifier indicates the natural language input is a complex natural language input, the system 120 may semantically tag (134) the complex natural language input. The system 120 may tag text data (representing the complex natural language input) to indicate the types of words represented in the text data. For example, the system 120 may tag a portion of text data (corresponding to one or more particular words) as a name, an address, a subject, a verb, a noun, etc.

The system 120 may use the semantic tags to identify (136) a first query (in the complex natural language input) and a second query (in the complex natural language input) that is dependent on the first query. For example, the system 120 may determine the first query based on different nouns included in the complex natural language input, and may determine the second query based on a verb and a noun included in the complex natural language input. In at least some embodiments, the system 120 may determine a second clause is dependent on a first clause based on and end portion of the second clause corresponding to a beginning portion of the first clause.

Figure 3:
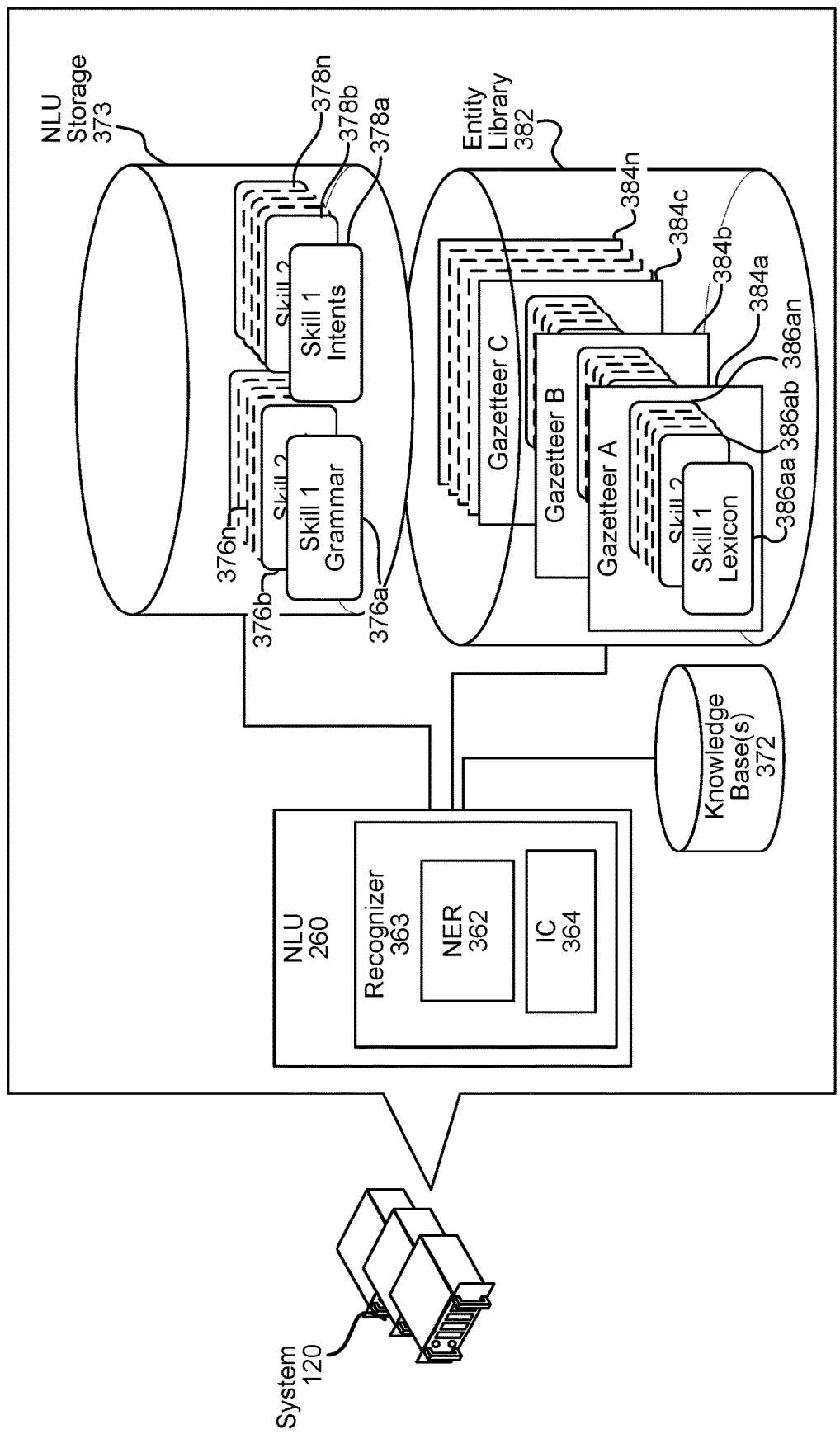
FIG. 3 is a conceptual diagram of how natural language understanding (NLU) processing may be performed, according to embodiments of the present disclosure.

The system 120 may determine (138) the first query is to undergo information retrieval processing (rather than intent classification (IC) processing discussed in detail herein below with respect to FIG. 3). For example, the system 120 may use a second trained classifier to determine that the first query is requesting information and an output responsive to the first query may be in the form of an answer that can be derived using a knowledge base, internet search engine, or other information storage and retrieval systems. Generally, the second classifier may be trained to determine whether a query is to be processed using IC processing or information retrieval processing. The second classifier may be trained using examples of non-complex natural language inputs capable of being processed using IC processing (e.g., "play [artist name] music," "turn on my first plug," "roll down my window," "turn the AC on to 65 degrees," etc.), and examples of non-complex natural language inputs capable of being handled by information retrieval processing (e.g., "who was the second president of the United States," "what is the capitol of Washington," "what is the population of New York City," etc.).

The system 120 may perform (140) information retrieval processing on the first query to determine a first query result (e.g., determine an entity corresponding to an answer to the first query). Thereafter, the system 120 may populate (142) at least one variable in the second query using the first query result. The system 120 may determine (144) the populated second query is to be processed using IC processing (rather than information retrieval processing). For example, the system may use the second trained classifier to determine that the populated second query is requesting performance of an action. As a result, the system 120 may perform (146) IC processing on the populated second query, and the result of the IC processing may be performance of an action responsive to the complex natural language input.

Figure 2:
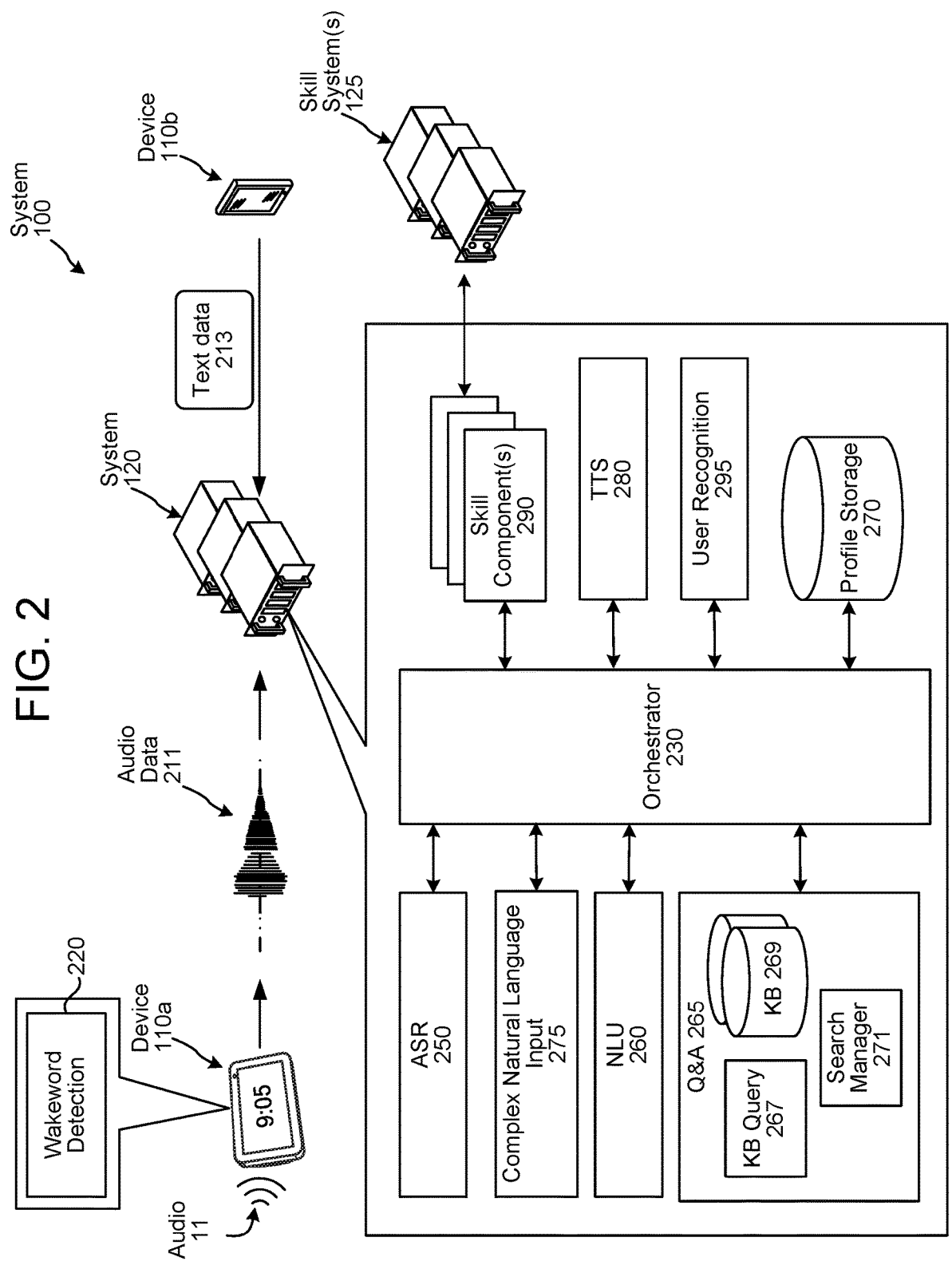
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

An audio capture component(s), such as a microphone or array of microphones of a device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when the user 5 intends to speak an input to the system 120. The device 110*a* may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110a may "wake" and begin transmitting audio data 211, representing the audio 11, to the system 120. The audio data 211 may include data corresponding to the detected wakeword, or the device 110a may remove the portion of the audio corresponding to the detected wakeword prior to sending the audio data 211 to the system 120.

The system 120 may include an orchestrator component 230 configured to receive the audio data 211 from the device 110a. The orchestrator component 230 may send the audio data 211 to an ASR component 250 that transcribes the audio data 211 into ASR output data including one or more ASR hypotheses. ASR output data may include one or more ASR hypotheses in the form of one or more textual interpretations or one or more tokens. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In addition to a device 110a receiving a spoken natural language input, a device 110b may receive a text-based (e.g., typed) natural language input. The device 110b may generate text data 213 representing the typed natural language input, and may send the text data 213 to the system 120, where the text data 213 is received by the orchestrator component 230.

Alternatively, the device 110a (or another device) may receive a gesture input embodied in two or more images. The device 110a (or the other device) may generate image data representing the images, and may send the image data to the system 120, where the image data may be received by the orchestrator component 230. The orchestrator component 230 (or another component of the system 120) may process the image data to determine a performed gesture, and may determine natural language text data (in storage) corresponding to the performed gesture. Alternatively, the device 110a (or the other device) may process the image data to determine the performed gesture, determine the natural language text data in storage, and may send the natural language text data to the system 120.

Alternatively, the device 110a (or another device) may receive be a motion sensor that detects movement. In response to detecting movement, the device 110a (or the other device) may generate sensor data representing the movement, and may send the sensor data to the system 120, where the sensor data may be received by the orchestrator component 230. The orchestrator component 230 (or another component of the system 120) may determine natural language text data (in storage) corresponding to the sensor data. Alternatively, the device 110a (or the other device) may determine the natural language text data in storage, and may send the natural language text data to the system 120.

Alternatively, the device 110a (or another device) may selection or some other interaction of a button. In response to detecting such, the device 110a (or the other device) may generate data representing the selection/interaction, and may send the data to the system 120, where the data may be received by the orchestrator component 230. The orchestrator component 230 (or another component of the system 120) may determine natural language text data (in storage) corresponding to the type of selection/interaction. Alternatively, the device 110a (or the other device) may determine the natural language text data in storage, and may send the natural language text data to the system 120.

The orchestrator component 230 may send the text data 213, the ASR output data, text data corresponding to a performed gesture, text data corresponding to sensor data, or text data corresponding to selection or other interaction of a button to a Q&A component 265. Within the Q&A component, the text data or ASR output data may be sent to a knowledge base (KB) query component 267. The knowledge base query component 267 may work in conjunction with a structured knowledge base(s) 269 to attempt to obtain information responsive to the text data or ASR output data. While illustrated as separate components, the system 120 may implement the NLU component 260 and the Q&A component 265 as a single component in at least some embodiments.

The knowledge base(s) 269 may include a collection of tuples or otherwise semantically (or otherwise) encoded data that can be queried to obtain information. For example a tuple such as [John Doe, husband of, Jane Doe] may describe that John Doe is Jane Doe's husband. Many such tuples may exist in a knowledge base and may be usable to answer incoming informational queries. For example, the above tuple may be used to answer a question such as "who is Jane Doe's husband," "who is John Doe married to" or the like.

The knowledge base(s) 269 may additionally or alternatively store data in a form representative of a knowledge graph, which may comprise a directed acyclic graph (DAG) that graphs nodes representing entities (e.g., people, places, things) connected by vertices or links where each link corresponds to a relationship. To answer questions about particular entities in a knowledge graph, the system may traverse a path along the knowledge graph from one entity to another and track the information along the traversed links to obtain information about how one entity relates to another. For example, a DAG may include a node for Jane Doe, a node for John Doe, a node for Jake Doe, etc. A link between Jane Doe and John Doe may be associated with a variety of information such as "married in 2002," "met in 2000," etc. A link between John Doe and Jake Doe may be associated with information such as "brothers" or the like. Even if there is no direct link between the node for Jane Doe and the node for Jake Doe, the system may be able to determine a path between the two, and gather information along the vertices along that path (e.g., from Jane Doe to John Doe and then from John Doe to Jake Doe) to obtain information needed to answer the query "when did John Doe become the brother-in-law of Jane Doe."

The knowledge base(s) 269 may also include a schema (for example defined by classes and properties) to organize its data.

The knowledge base(s) 269 may store data from various content sources. For example, the knowledge base(s) 269 may store data from internet websites.

In at least some embodiments, the knowledge base(s) 269 may include data representing an environment surrounding a device 110 of the user 5. For example, in conjunction with receiving a natural language input from the user 5, the system 120/device 110 may receive image data (or video data corresponding to consecutively captured images) from one or more cameras of a device 110 of the user 5. The system 120/device 110 may process the image data (or video data) to determine entities represented in the image data (for example using object recognition processing as known and not yet known in the art). The system 120/device 110 may construction a personalized knowledge base(s) 269 to include the determined entities.

At least partially in parallel to the knowledge base query component 267 attempting to find an answer to the text data or ASR output data using the knowledge base(s) 269, the Q&A component 265 may operate a search manager 271 to attempt to find an answer to the text data or ASR output data using an unstructured web search.

Figure 4:
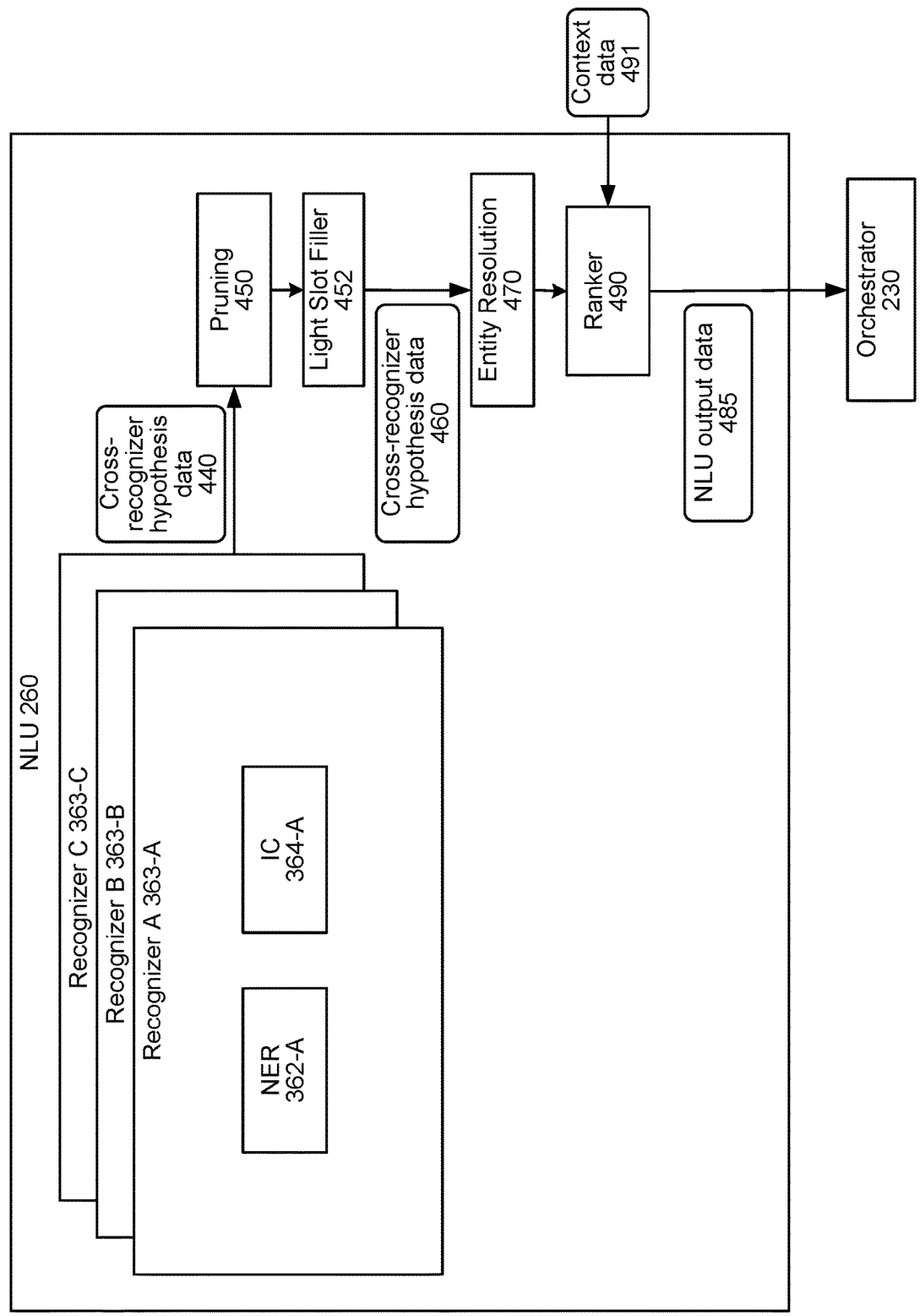
FIG. 4 is a conceptual diagram of how NLU processing may be performed, according to embodiments of the present disclosure.

The orchestrator component 230 may additionally or alternatively send the text data or the ASR output data to an NLU component 260. FIGS. 3-4 illustrate how the NLU component 260 may perform NLU processing.

The NLU component 260 may include one or more recognizers 363. In at least some embodiments, a recognizer 363 may be associated with a skill (e.g., the recognizer may be configured to interpret a natural language input to correspond to the skill). As used herein, a "skill" may refer to a skill component 290, a skill system 125, or a combination of a skill component 290 and corresponding skill system 125.

In at least some other embodiments, a recognizer 363 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and a custom domain.

Recognizers 363 may process in parallel, in series, partially in parallel, etc. For example, a recognizer corresponding to a first domain may process at least partially in parallel to a recognizer corresponding to a second domain. For further example, a recognizer corresponding to a first skill may process at least partially in parallel to a recognizer corresponding to a second skill. In yet another example, a recognizer corresponding to a skill may process at least partially in parallel to a recognizer corresponding to a domain.

The NLU component 260 may communicate with an NLU storage 373 including skill grammars (376a-376n), representing how natural language inputs may be formulated to invoke skills, and skill intents (378a-378n) representing intents supported by respective skills.

Each recognizer 363 may be associated with a particular grammar 376, one or more particular intents 378, and a particular personalized lexicon 386 (stored in an entity library 382). A gazetteer 384 may include skill-indexed lexical information associated with a particular user. For example, Gazetteer A (384a) may include skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information may improve entity resolution.

Each recognizer 363 may include a named entity recognition (NER) component 362 that attempts to identify grammars and lexical information that may be used to construe meaning with respect to text data/ASR output data input therein. An NER component 362 identifies portions of text data/ASR output data that correspond to a named entity that may be recognizable by the system 120. An NER component 362 may also determine whether a word refers to an entity that is not explicitly mentioned in the text data/ASR output data, for example "him," "her," "it" or other anaphora, exophora or the like.

An NER component 362 applies grammar models 376 and lexical information 386 associated with one or more skills to determine a mention of one or more entities in text data/ASR output data input therein. In this manner, an NER component 362 identifies "slots" (i.e., particular words in text data/ASR output data) that may be needed for later processing. An NER component 362 may also label each slot with a type (e.g., noun, place, city, artist name, song name, etc.).

Each grammar model 376 may include the names of entities (i.e., nouns) commonly found in natural language corresponding to a particular skill to which the grammar model 376 relates, whereas lexical information 386 may be personalized to the user identifier output by a user recognition component 295 for the natural language input. For example, a grammar model 376 associated with a shopping skill may include a database of words commonly used when people discuss shopping.

A downstream process called named entity resolution actually links a portion of text data/ASR output data (identified by an NER component 362) to a specific entity known to the system 120. To perform named entity resolution, the NLU component 260 may use gazetteer information (384a-384n) stored in the entity library storage 382. The gazetteer information 384 may be used to match text data/ASR output data (identified by an NER component 362) with different entities, such as song titles, contact names, etc. Gazetteers may be linked to users (e.g., a particular gazetteer may be associated with a specific user's music collection), may be linked to certain skills (e.g., a shopping skill, a music skill, a video skill, a communications skill, etc.), or may be organized in another manner.

Each recognizer 363 may also include an intent classification (IC) component 364 that processes text data/ASR output data to determine an intent(s) of a skill(s) that potentially corresponds to the natural language input represented in the text data/ASR output data. An intent corresponds to an action to be performed that is responsive to the natural language input. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data/ASR output data to the words and phrases in an intents database 378 associated with the skill(s) that is associated with the recognizer 363 implementing the IC component 364.

The intents identifiable by a specific IC component 364 may be linked to one or more skill-specific grammar frameworks 376 with "slots" to be filled. Each slot of a grammar framework XXB76 corresponds to a portion of text data/ASR output data that an NER component 362 believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may identify words in text data/ASR output data as subject, object, verb, preposition, etc. based on grammar rules and/or models prior to recognizing named entities in the text data/ASR output data. An IC component 364 (implemented by the same recognizer 363 as the NER component 362) may use the identified verb to identify an intent. The NER component 362 may then determine a grammar model 376 associated with the identified intent. For example, a grammar model XXB76 for a <PlayMusic> intent may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data/ASR output data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data/ASR output data using heuristic grammar rules, or a model may be constructed using techniques such as hidden Markov models, maximum entropy models, log linear models, conditional random fields (CRF), and the like. For example, an NER component 362, implemented by a music skill or music domain recognizer 363, may parse and tag text data/ASR output data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill or music domain, which an IC component 364 may determine corresponds to a <PlayMusic> intent. At this stage, no determination has been made as to the meaning of "mother's little helper" and "the rolling stones," but based on grammar rules and models, the NER component 362 has determined that these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data/ASR output data corresponds to "play songs by the rolling stones," after failing to determine an album name or song name called "songs" by "the rolling stones," the NER component 362 may search a music skill vocabulary for the word "songs." In the alternative, generic words may be checked before the gazetteer information, or both may be tried, potentially producing two different results.

A recognizer 363 may tag text data/ASR output data to attribute meaning thereto. For example, a recognizer 363 may tag "play mother's little helper by the rolling stones" as: {skill} Music, {intent} Play Music, {artist name} rolling stones, {media type} SONG, and {song title} mother's little helper. For further example, a recognizer 363 may tag "play songs by the rolling stones" as: {skill} Music, {intent} Play Music, {artist name} rolling stones, and {media type} SONG.

As described above, more than one recognizer 363 may process with respect to text data/ASR output data representing a single natural language input. In such instances, each recognizer 363 may output at least one NLU hypothesis including an intent indicator (determined by an IC component 364 of the recognizer 363) and at least one tagged named entity (determined by an NER component 362 of the recognizer 363).

The NLU component 260 may aggregate NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, one or more skills, etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones

[0.70] Intent: <PlayVideo> VideoTitle: GameOfThrones.

While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses according to their respective scores. The pruning component 450 may then perform score thresholding with respect to the cross-recognizer hypothesis data 440. For example, the pruning component 450 may select NLU hypotheses associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component XXC50 is to create a reduced list of NLU hypotheses so that downstream, more resource intensive, processes may only operate on NLU hypotheses that most likely represent the natural language input.

The NLU component 260 may include a light slot filler component 452 that takes text data, represented in the NLU hypotheses output by the pruning component 450, and alters it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text data is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill, domain, etc. to which a NLU hypothesis relates. For example, for a travel skill-specific NLU hypothesis, the entity resolution component 470 may transform text data corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text data. Referring to the example natural language input "play songs by the stones," the entity resolution component 470 may reference a personal music catalog, Amazon Music account, user profile, or the like. The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill to perform an action responsive to the natural language input. The NLU component 260 may include multiple entity resolution components that are each specific to one or more different skills, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also context data 491.

The context data 491 indicate skill ratings or popularities. For example, if a skill has a high rating, the ranker component 490 may increase the score of a NLU hypothesis associated with that skill, and vice versa.

The context data 491 may indicate skills that have been enabled by the user 5. For example, the ranker component 490 may assign higher scores to NLU hypotheses associated with enabled skills than to NLU hypotheses associated with skills that have not been enabled by the user 5.

The context data 491 may indicate a system usage history (e.g., specific to the user 5), such as if the user 5 regularly invokes a particular skill or does so at particular times of day. The context data 491 may indicate a present date, a present time, a location of the device 110, weather data, a type of the device 110, user preferences, as well as other context data. For example, the ranker component 490 may consider when any particular skill is currently active with respect to the present user 5 and/or device 110 (e.g., music being output by the skill when the current natural language input is received).

The ranker component 490 may output NLU output data XXC85 including one or more NLU hypotheses. The NLU component 260 may send the NLU output data 285 to the orchestrator component 230.

The system 120 may include one or more skill components 290 and/or may communicate with one or more skill systems 125 via one or more skill components 290. A skill component 290, skill system 125, and a combination of a skill component 290 and skill system 125 may be referred to herein as a "skill." A skill may be configured to execute with respect to NLU output data 485. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include a user recognition component 295. In at least some embodiments, the user recognition component 295 may be implemented as a skill.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to natural language inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 125 that the user has enabled. When a user enables a skill component 125, the user is providing the system 120 with permission to allow the skill component 125 to execute with respect to the user's natural language inputs. If a user does not enable a skill component 125, the system 120 may not invoke the skill component 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data. A device profile may also include one or more user identifiers, corresponding to one or more user profiles associated with the device profile. For example, a household device's profile may include the user identifiers of users of the household.

The system 120 may additional include a complex natural language input component 275 configured to determine whether a natural language input is a complex natural language input, as well as coordinate routing of different queries within the complex natural language input. Specific details of the complex natural language input component 275 are provided herein below.

Figure 5:
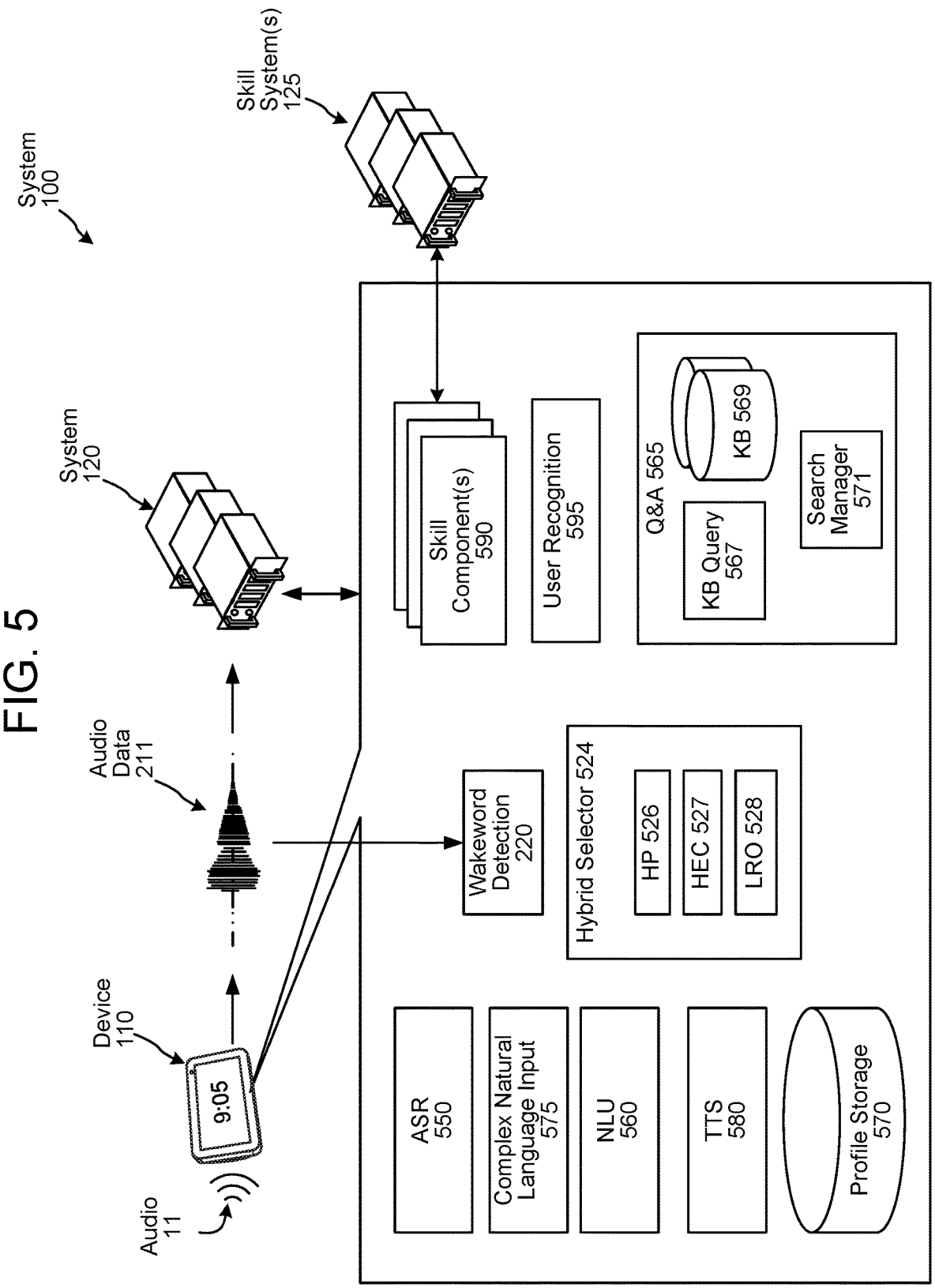
FIG. 5 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 5 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component XA20 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 524, of the device 110, may send the audio data 211 to the wakeword detection component 220. If the wakeword detection component 220 detects a wakeword in the audio data 211, the wakeword detection component 220 may send an indication of such detection to the hybrid selector 524. In response to receiving the indication, the hybrid selector 524 may send the audio data 211 to the system 120 and/or the ASR component 550. The wakeword detection component 220 may also send an indication, to the hybrid selector 524, representing a wakeword was not detected. In response to receiving such an indication, the hybrid selector 524 may refrain from sending the audio data 211 to the system 120, and may prevent the ASR component 550 from further processing the audio data 211. In this situation, the audio data 211 can be discarded.

The device 110 may conduct its own speech processing using on-device language processing components, such as an ASR component 550 and an NLU 560, similar to the manner discussed above with respect to the ASR component 250 and the NLU component 560 of the system 120. The device 110 may also internally include, or otherwise have access to, other components such as one or more skill components 590 capable of executing commands based on NLU output data or other results determined by the device 110/system 120, a user recognition component 595 (configured to process in a similar manner to that discussed above with respect to the user recognition component 295 of the system 120), profile storage 570 (configured to store similar profile data to that discussed above with respect to the profile storage 270 of the system 120), or other components. In at least some embodiments, the profile storage 570 may only store profile data for a user or group of users specifically associated with the device 110. Similar to as described above with respect to FIG. 2, a skill component 590 may communicate with a skill system(s) 125.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the language processing results generated by the device 110 may indicate a low confidence or other metric indicating that the processing by the device 110 may not be as accurate as the processing done by the system 120.

The hybrid selector 524, of the device 110, may include a hybrid proxy (HP) 526 configured to proxy traffic to/from the system 120. For example, the HP 526 may be configured to send messages to/from a hybrid execution controller (HEC) 527 of the hybrid selector 524. For example, command/directive data received from the system 120 can be sent to the HEC 527 using the HP 526. The HP 526 may also be configured to allow the audio data 211 to pass to the system 120 while also receiving (e.g., intercepting) this audio data 211 and sending the audio data 211 to the HEC 527.

In at least some embodiments, the hybrid selector 524 may further include a local request orchestrator (LRO) 528 configured to notify the ASR component 550 about the availability of new audio data 211 that represents user speech, and to otherwise initiate the operations of local language processing when new audio data 211 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to generate a directive). Meanwhile, a "terminate" event may instruct a component to terminate further execution, such as when the device 110 receives directive data from the system 120 and chooses to use that remotely-generated directive data.

Thus, when the audio data 211 is received by the voice services component 522, the HP 526 may allow the audio data 211 to pass through to the system 120 and the HP 526 may also input the audio data 211 to the on-device ASR component 550 by routing the audio data 211 through the HEC 527 of the hybrid selector 524, whereby the LRO 528 notifies the ASR component 550 of the audio data 211. At this point, the hybrid selector 524 may wait for response data from either or both of the system 120 or the local language processing components. However, the disclosure is not limited thereto, and in some examples the hybrid selector 524 may send the audio data 211 only to the local ASR component 550 without departing from the disclosure. For example, the device 110 may process the audio data 211 locally without sending the audio data 211 to the system 120.

The local ASR component 550 is configured to receive the audio data 211 from the hybrid selector 524, and to recognize speech in the audio data 211, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the local language processing component 540 (and/or the system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

The local Q&A component 565 is configured to determine information responsive to the speech. The Q&A component 565 may include similar components to that of the Q&A component 265 of the system 120. For example, the Q&A component 565 may include a knowledge base query component 567 that processes similarly to the knowledge base query component 267 of the system 120, may include a knowledge base(s) 569 that stores data as described above with respect to the knowledge base 269 of the system 120, and may include a search manager 571 that processes similarly to the search manager 271 of the system 120 described above. While illustrated as separate components, the device 110 may implement the NLU component 560 and the Q&A component 565 as a single component in at least some embodiments.

An NLU hypothesis (output by the NLU component 560) or information (output by the Q&A component 565) may be selected as usable to respond to a natural language input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify which natural language input the response data corresponds.

In at least some embodiments, the device 110 may include, or be configured to use, one or more skill components 590 that may work similarly to the skill component(s) 290 implemented by the system 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 590, a skill system 125, or a combination of a skill component 590 and a corresponding skill system 125.

In at least some embodiments, the complex natural language input component 275/575 may not execute with respect to every natural language input (e.g., spoken natural language input, text-based natural language input, signal data corresponding to a natural language input, image data of a gesture corresponding to a natural language input, etc.) received by the system 120/device 110. In at least some embodiments, the system 120/device 110 may include a complex natural language input classifier 610 configured to classify a received natural language input as either a complex natural language input or a non-complex natural language input, and send the complex natural language input to the complex natural language input component 275/575 for further processing.

The complex natural language input classifier 610 may receive data 605 corresponding to an n-best list of ASR hypotheses (when the natural language input is a spoken natural language input) or text data (when the input is a text-based natural language input, sensor data, image data, or other data associated with pre-stored natural language input text data). The complex natural language input classifier 610 processes the data 605 to determine whether the natural language input (represented in the data 605) is a complex natural language input or a non-complex natural language input. If the complex natural language input classifier 610 determines the data 605 corresponds to a complex natural language input, the complex natural language input classifier 610 may effectively determine that (1) processing of the data 610, by the NLU component 260/560 (and more particularly by one or more IC components 364 of the NLU component 260/560), would result in an error condition (e.g., would result in a confidence score (such as an NLU processing confidence score) failing to satisfy a condition, such as a threshold confidence score), and that (2) processing of the data 610, by the Q&A component 265/565 (or another component configured to provide information responsive to a query, such as a skill), would result in an error condition (e.g., would result in a confidence score (such as a Q&A processing or other information retrieval processing confidence score) failing to satisfy a condition, such as a threshold Q&A (or information retrieval) processing confidence score). Conversely, if the complex natural language input classifier 610 determines the data 605 corresponds to a non-complex natural language input, the complex natural language input classifier 610 may effectively determine that (1) processing of the data 610, by the NLU component 260/560 (and more particularly by one or more IC components 364 of the NLU component 260/560), would result in a confidence score that satisfies a condition, such as a threshold confidence score, or that (2) processing of the data 610, by the Q&A component 265/565 (or other information retrieval component, such as a skill), would result in a confidence score that satisfies a condition, such as a threshold confidence score.

In at least some embodiments, the complex natural language input classifier 610 may be trained using positive examples of complex natural language inputs and negative examples of non-complex natural language inputs. In at least some other embodiments, rather than using negative examples, the complex natural language input classifier 610 may be trained using positive examples to establish a ground truth for the classifier. In such embodiments, the complex natural language input classifier 610 may output confidence scores that, when satisfying a condition (e.g., a threshold confidence score), indicate that the natural language input (represented in the data 605) is likely a complex natural language input. Conversely, when the complex natural language input classifier 610 is trained as such, confidence scores, output by the complex natural language input classifier 610 and failing to satisfy the condition, indicate that the natural language input is likely a non-complex natural language input.

In at least some embodiments, the complex natural language input classifier 610 may be trained using positive examples of non-complex natural language inputs and negative examples of complex natural language inputs. In at least some other embodiments, rather than using negative examples, the complex natural language input classifier 610 may be trained using positive examples to establish a ground truth for the classifier. In such embodiments, the complex natural language input classifier 610 may output confidence scores that, when satisfying a condition (e.g., a threshold confidence score), indicate that the natural language input (represented in the data 605) is likely a non-complex natural language input. Conversely, when the complex natural language input classifier 610 is trained as such, confidence scores, output by the complex natural language input classifier 610 and failing to satisfy the condition, indicate that the natural language input is likely a complex natural language input.

In at least some embodiments, when the natural language input is a spoken natural language input, the complex natural language input classifier 610 may receive an ASR processing confidence score representing a confidence of ASR processing to generate the ASR n-best hypotheses. In at least some embodiments, the higher the ASR processing confidence score, the more confident the complex natural language input classifier 610 may be in its determinations (such increased confidence may be reflected in the data/score output by the complex natural language input classifier 610). Conversely, the lower the ASR processing confidence score, the less confident the complex natural language input classifier 610 may be in its determinations (such lesser confidence may be reflected in the data/score output by the complex natural language input classifier 610).

Figure 6:
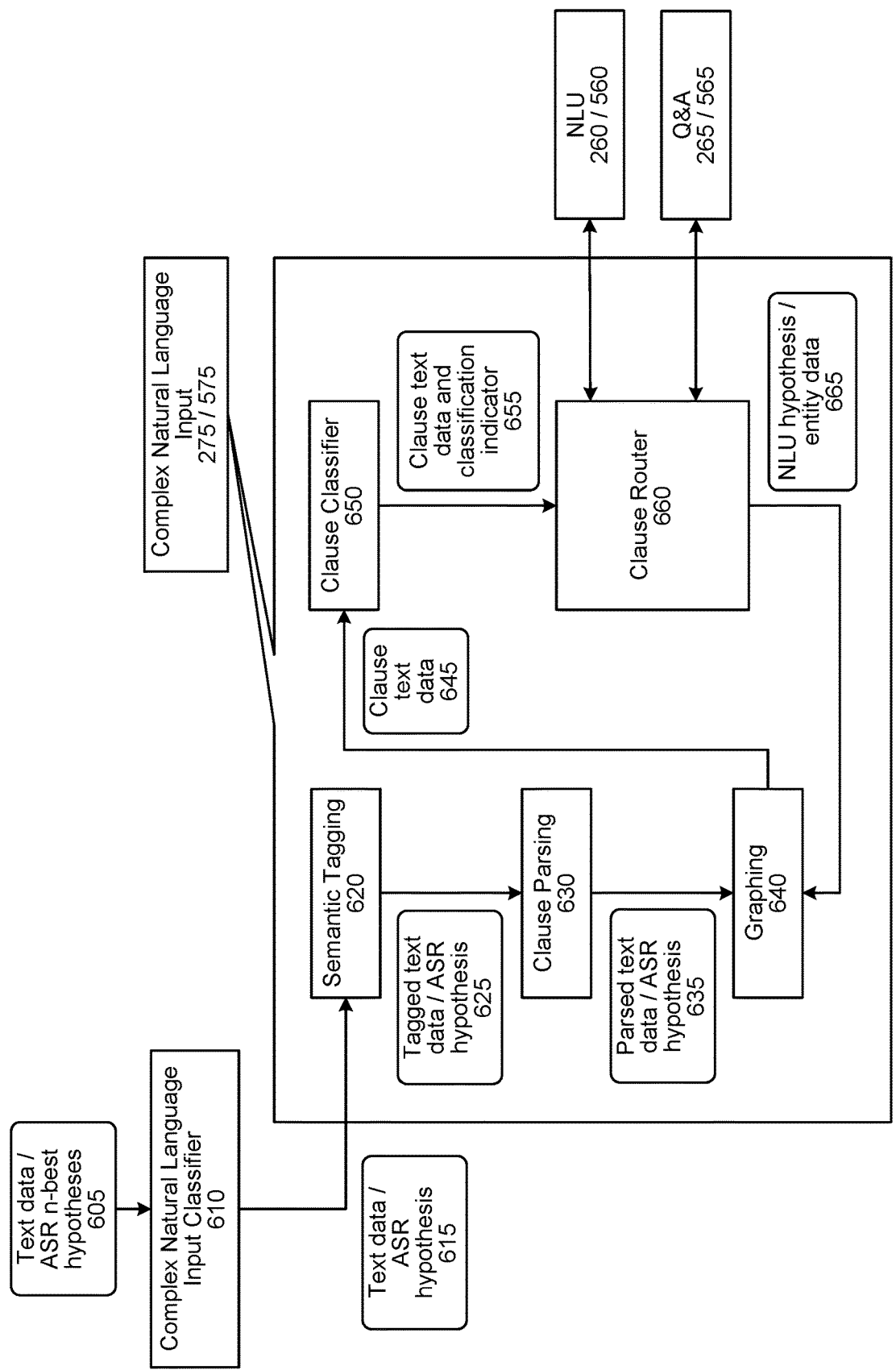
FIG. 6 is a conceptual diagram illustrating processing performable by a complex natural language input component, according to embodiments of the present disclosure.

While the foregoing describes, and FIG. 6 illustrates, implementation of a complex natural language input classifier 610 by the system 120/device 110, the present disclosure is not limited thereto. In at least some embodiments, the system 120/device 110 may implement a trained component configured to perform the processes described above with respect to the complex natural language input classifier 610. The trained component may include one or more machine learning models, including but not limited to, one or more neural networks, one or more probabilistic graphs, one or more decision trees, and others. In other embodiments, the trained component may include a rules-based engine, one or more statistical-based algorithms, one or more mapping functions, or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While not illustrated in FIG. 6, if the complex natural language input classifier 610 outputs a confidence score representing the natural language input is likely a non-complex natural language input, the complex natural language input classifier 610 may cause the data 605 to be sent to the NLU component 260/560, the Q&A component 265/565, and/or a skill for IC processing, Q&A processing, or other information retrieval processing, respectively. Conversely, if the complex natural language input classifier 610 outputs a confidence score representing the natural language input is likely a complex natural language input, the complex natural language input classifier 610 may cause data 615 (corresponding to the text data or a single ASR hypothesis input to the complex natural language input classifier 610) to be input to a semantic tagging component 620 of the complex natural language input component 275/575. In at least some embodiments, when the complex natural language input classifier 610 receives an n-best list of ASR hypotheses, the complex natural language input classifier 610 may cause only the top-scoring ASR hypothesis to be input to the semantic tagging component 620.

The semantic tagging component 620 may tag different portions (e.g., individual words or combinations of words) of the data 615 (corresponding to the natural language text data or ASR hypothesis) in a rather high-level, non-granular manner. In at least some embodiments, the semantic tagging component 620 may tag portions of the data 615 based on an ontology representing different types of entities understandable by the system 120/device 110. For example, an ontology may include a first top category corresponding to "persons," a second top category corresponding to "places," a third top category corresponding to "objects," a fourth top category corresponding to "names," etc. Each of the top categories may include further-refined/child categories. For example, the "persons" category may include the categories "entertainers" and "politicians," the "places" category may include the categories "countries" and "USA cities," and the "objects" category may include the categories "vehicles" and "furniture." It will be appreciated that the foregoing ontology is merely descriptive, and that the configuration and substance of the ontology is configurable. In at least some embodiments, the semantic tagging component 620 may be configured to tag portions of the data 615 based on top-level categories of the ontology. In at least some embodiments, the ontology, with respect to which the semantic tagging component 620 processes, may not be specific to any particular skill or domain. This enables the semantic tagging component 620 to be skill/domain agnostic. The semantic tagging component 620 may additionally tag words in the data 615 based on word type (e.g., verb, noun, adverb, adjective, etc.). The semantic tagging component 620 may output tagged data 625 (i.e., the text data or ASR hypothesis associated with one or more semantic tags), which may be input to a clause parsing component 630.

The clause parsing component 630 is configured to parse the natural language input (i.e., parse the tagged text data or ASR hypothesis) to break up the natural language input into multiple clauses that, individually, are capable of being processed by an component(s) 364 and/or an information retrieval component (such as the Q&A component 265/565 or a skill). The clause parsing component 630, in at least some embodiments, may implement a deep neural network (DNN) trained using data representing various complex natural language inputs annotated (e.g., by a human) to identify the individual clauses within the complex natural language inputs.

In at least some respects, the clause parsing component 630 may be considered to run a first-level intent classifier in that the clause parsing component 630 may attribute a verb to an intent, but the clause parsing component 630 may be unable to determine a specificity of the intent, such as whether the verb corresponds to a <PlayGame> intent, a <PlayMusic> intent, a <PlayVideo> intent, a <PlayeBook> intent, a <Purchase> intent, a <TurnOn> intent, etc. The latter level of intent classification processing may be reserved for the NLU component 260/560.

As an example, the data 625, input to the clause parsing component 630, may correspond to the natural language input "play that new movie with [actor/actress name] and the aliens." In this example, the clause parsing component 630 may process the data 625 to determine a first clause corresponding to "play that new movie" (in which "that new movie" may be considered a variable), and a second clause corresponding to "new movie with [actor/actress name] and the aliens." As used herein, a "variable" may refer to a portion of a clause (corresponding to a portion of a complex natural language input) that cannot be resolved (i.e., understood) using the information within the clause. Additional information, for example from resolution of another clause of the same complex natural language input, may be needed to resolve the variable.

As another example, the data 625, input to the clause parsing component 630, may correspond to the natural language input "what is the new movie with [actor/actress name] and the aliens." In this example, the clause parsing component 630 may process the data 625 to determine a first clause corresponding to "what is the new movie" (in which "the new movie" may be considered a variable), and a second clause corresponding to "new movie with [actor/actress name] and the aliens."

For further example, the data 625, input to the clause parsing component 630, may correspond to the natural language input "play the title song of the latest album of [artist name]." In this example, the clause parsing component 630 may process the data 625 to determine a first clause corresponding to "play the title song" (in which "the title song" may be considered a variable), a second clause corresponding to "title song of latest album" (in which "latest album" may be considered a variable) and a third clause corresponding to "latest album by [artist name]."

As another example, the data 625, input to the clause parsing component 630, may correspond to the natural language input "get me directions to the stadium the Seahawks are playing at today." In this example, the clause parsing component 630 may process the data 625 to determine a first clause corresponding to "get directions to the stadium" (in which "the stadium" may be considered a variable), a second clause corresponding to "the stadium the Seahawks are playing at today," and a third clause corresponding to "the Seahawks."

As an additional example, the data 625, input to the clause parsing component 630, may correspond to the natural language input "Show me hotels in the capitol of Switzerland." In this example, the clause parsing component 630 may process the data 625 to determine a first clause corresponding to "show me hotels" (in which "hotels" may be considered a variable), a second clause corresponding to "hotels in the capitol of Switzerland," and a third clause corresponding to "capitol of Switzerland."

As illustrated by the above examples, a first clause may include a portion (i.e., one or more words) of the complex natural language input that overlaps with a portion (i.e., one or more words) of the complex natural language included in a second clause. Moreover, in at least some embodiments, each clause may be configured to include at least one noun and some surrounding words.

The clause parsing component 630 may send data 635 (corresponding to the parsed portions of the text data or ASR hypothesis) to a graphing component 640. The graphing component 640 is configured to generate an execution graph representing the complex natural language input. The graphing component 640 may generate execution graphs in which each node corresponds to a different clause of a complex natural language input, and connections between nodes represents dependencies of the clauses.

The graphing component 640 may determine clause dependencies using various techniques. In one technique, the graphing component 640 may determine a dependency based on the end portion of one clause and the beginning portion of another clause.

For example, for the complex natural language input "play that new movie with [actor/actress name] and the aliens," the graphing component 640 may receive data 635 representing a first clause "play that new movie" and a second clause "new movie with [actor/actress name] and the aliens." In this example, the graphing component 640 may determine the first clause depends from the second clause based on the first clause ending with "new movie" and the second clause beginning with "new movie."

As another example, for the complex natural language input "what is the title song of the latest album of [artist name]," the graphing component 640 may receive data 635 representing a first clause "what is the title song," a second clause "title song of latest album," and a third clause "latest album by [artist name]." In this example, the graphing component 640 may determine the first clause depends from the second clause based on the first clause ending with "title song" and the second clause beginning with "title song," and may determine the second clause depends from the third clause based on the second clause ending with "latest album" and the third clause beginning with "latest album."

In at least some embodiments, the graphing component 640 may store an execution graph as two tables of data. For example, one table may represent nodes of the execution graph, and the other table may represent node connections of the execution graph. Each entry in the node table may include, for example, a node identifier, identifiers of connections that come off the node, and data describing a value of the node. Each entry in the connection table may include, for example, a connection identifier, a node identifier corresponding to a node from which the connection points, a node identifier corresponding to a node to which the connection points, and data describing a function of the connection.

Figure 7:
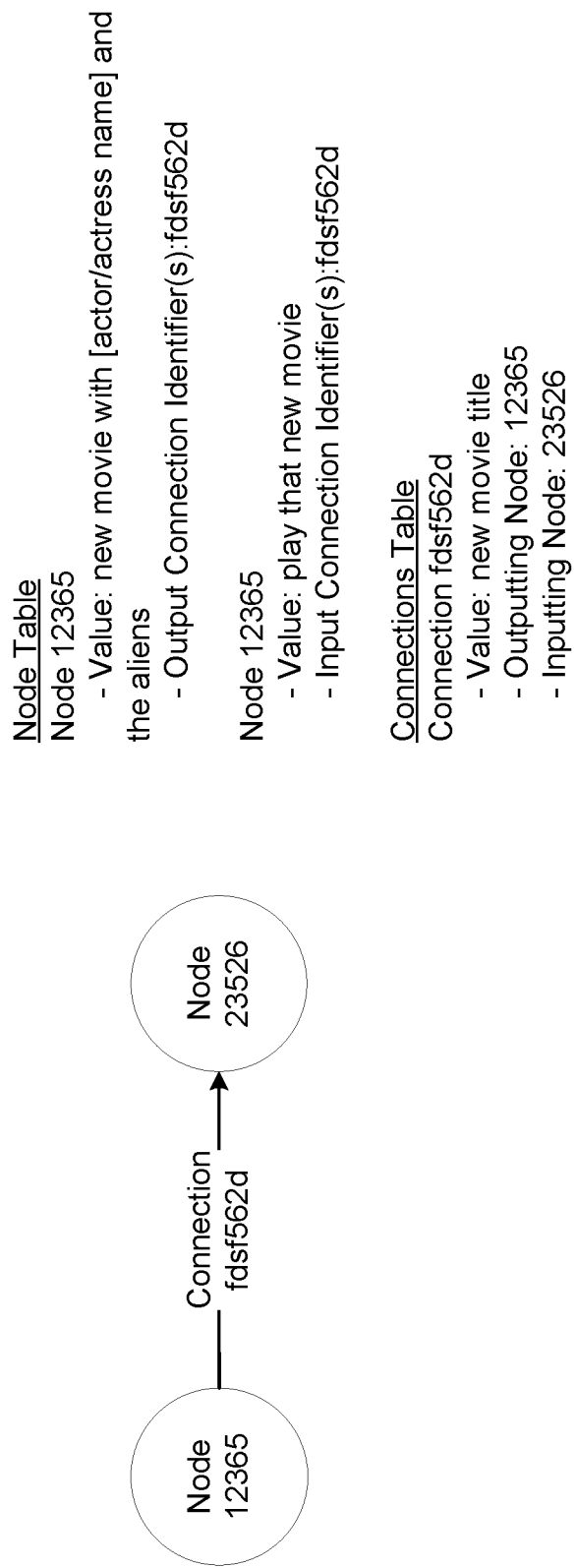
FIG. 7 is a conceptual diagram of an example execution graph and corresponding node and connection data, according to embodiments of the present disclosure.

For example, FIG. 7 illustrates an example execution graph, and corresponding node and connection data, for the complex natural language input "play that new movie with [actor/actress name] and the aliens." As illustrated, the execution graph may include a node 12365, a connection fdsf562*d*, and a node 23526. As illustrated by the directional arrow of the connection fdsf562*d* in FIG. 7, the node 23526 is dependent on an output of processing performed with respect to the node 12365.

As further illustrated in FIG. 7, a node table for the execution graph may include node data, for the node 12365, including a value of (corresponding to the clause) "new movie with [actor/actress name] and the aliens," and an output connection identifier fdsf562*d*. The node table may also include node data, for the node 23526, including a value of (corresponding to the clause) "play that new movie," and an input connection identifier fdsf562*d*. A connections table for the execution graph may include connection data, for the connection fdsf562*d*, including a value of "new movie title," an outputting node identifier 12362 (representing the connection is output from the node 12365), and an inputting node identifier 23526 (representing the connection is input to the node 23526).

For example, FIG. 8 illustrates an example execution graph, and corresponding node and connection data, for the complex natural language input "what is the title song of the latest album of [artist name]." As illustrated, the execution graph may include a node adfds, a connection 5*d*5*d*3, a node jkj, a connection 92*d*83, and a node gf55. As illustrated by the directional arrow of the connection 5*d*5*d*3, the node jkj is dependent on an output of processing performed with respect to the node adfds. Moreover, as illustrated by the direction arrow of the connection 92*d*83, the node gf55 is dependent on an output of processing performed with respect to the node jkj.

As further illustrated in FIG. 8, a node table for the execution graph may include node data, for the node adfds, including a value of (corresponding to the clause) "latest album by [artist name]," and an output connection identifier 5*d*5*d*3. The node table may also include node data, for the node jkj, including a value of (corresponding to the clause) "title song of latest album," an input connection identifier 5*d*5*d*3, and an output connection identifier 92*d*83. The node table may further include node data, for the node gf55, including a value (corresponding to the clause) "what is the title song," and an input connection identifier 92*d*83.

As illustrated in FIG. 8, a connections table for the execution graph may include connection data, for the connection 5*d*5*d*3, including a value of "latest album title," an outputting node identifier adfds (representing the connection is output from the node adfds), and an inputting node identifier jkj (representing the connection is input to the node jkj). The connections table may further include connection data, for the connection 92*d*83, including a value of "title song title," an outputting node identifier jkj (representing the connection is output from the node jkj), and an inputting node identifier gf55 (representing the connection is input to the node gf55).

A node in an execution graph may include one or more variables to be replaced with a value determined from processing of a dependent node. For example, in FIG. 7, the "new movie" portion of the value for node 23526 may be a variable to be replaced with a movie title determined from processing performed with respect to the node 12365 (i.e., processing performed with respect to the clause "new movie with [actor/actress name] and the aliens"). For further example, in FIG. 8, the "latest album" portion of the value of node jkj may be a variable to be replaced with an album title determined from processing performed with respect to the node adfds (i.e., processing performed with respect to the clause "latest album by [artist name]"), and the "title song" portion of the value of node gf55 may be a variable to be replaced with a song title determined from processing performed with respect to the node jkj (i.e., processing performed with respect to the clause "title song of latest album").

While FIGS. 7-8 illustrate execution graphs representing two and three clauses of two different complex natural language inputs, respectively, the present disclosure is not limited thereto. The teachings of the present disclosure allow a user to formulate complex natural language inputs in various manners and having various complexities (i.e., having varying numbers of clauses). It will thus be appreciated that the graphing component 640 may generate execution graphs having more than 3 nodes and having varying node dependencies from those illustrated and described herein.

With reference to FIGS. 6 and 9, after generating the execution graph, the graphing component 640 may determine (902) an independent node in the execution graph (i.e., a node not dependent on a result of processing of another node in the execution graph). For example, node 12365 is an independent node illustrated in FIG. 7, and node adfds is an independent node in FIG. 8. Upon determining the independent node, the graphing component 640 may send (904) clause text data 645 (i.e., the node's value) to a clause classifier 650 of the complex natural language input component 275/575. The graphing component 604 may also send (906) the node's identifier to the clause classifier 650. While FIG. 9A illustrates the graphing component 640 sending the clause text data 645 and the node identifier to the clause classifier 650 as separate data transmissions, it will be appreciated that the graphing component 640 may send the clause data text 645 and the node identifier to the clause classifier 650 as a single data transmission.

Generally, the clause classifier 650 is configured to classify clause text data as being either a transactional query (capable of being processed by an IC component(s) 364) or an informational query (capable of undergoing information retrieval processing using the Q&A component 265/565 or a skill). In at least some embodiments, the clause classifier 650 may be trained using positive examples of non-complex natural language inputs capable of being processed by an IC component(s) 364, and negative examples of non-complex natural language inputs capable of being processed by one or more information retrieval components (such as the Q&A component 265/565 or a skill). In such embodiments, the clause classifier 650 may output confidence scores that, when satisfying a condition (e.g., a threshold confidence score), indicate that the clause (represented in the clause text data 645) is likely a transactional query. Conversely, when the clause classifier 650 is trained as such, confidence scores, output by the clause classifier 650 and failing to satisfy the condition, indicate that the clause is likely an informational query.

In at least some embodiments, the clause classifier 650 may be trained using positive examples of non-complex natural language inputs capable of being processed by an information retrieval component (such as the Q&A component 265/565 or a skill), and negative examples of non-complex natural language inputs capable of being processed by an IC component(s) 364. In such embodiments, the clause classifier 650 may output confidence scores that, when satisfying a condition (e.g., a threshold confidence score), indicate that the clause (represented in the clause text data 645) is likely an informational query. Conversely, when the clause classifier 650 is trained as such, confidence scores, output by the clause classifier 650 and failing to satisfy the condition, indicate that the clause is likely a transactional query.

In at least some embodiments, the clause classifier 650 may be trained using positive examples of entities capable of being understood by an NER component(s) 362, and negative examples of entities capable of being understood by an information retrieval component (such as the Q&A component 265/565 or a skill). In such embodiments, the clause classifier 650 may output confidence scores that, when satisfying a condition (e.g., a threshold confidence score), indicate that the clause (represented in the clause text data 645) is likely capable of being processed by the NER component(s) 362. Conversely, when the clause classifier 650 is trained as such, confidence scores, output by the clause classifier 650 and failing to satisfy the condition, indicate that the clause is likely capable of being processed using information retrieval processing.

In at least some embodiments, the clause classifier 650 may be trained using positive examples of entities capable of being understood by an information retrieval component (such as the Q&A component 265/565 or a skill), and negative examples of entities capable of being understood by an NER component(s) 362. In such embodiments, the clause classifier 650 may output confidence scores that, when satisfying a condition (e.g., a threshold confidence score), indicate that the clause (represented in the clause text data 645) is likely capable of being processed using information retrieval processing. Conversely, when the clause classifier 650 is trained as such, confidence scores, output by the clause classifier 650 and failing to satisfy the condition, indicate that the clause is likely capable of being processed by an NER component(s) 362.

In at least some embodiments, rather than outputting a particular confidence score, the clause classifier 650 may output a binned confidence value (e.g., low, medium, high).

The clause classifier 650 may be trained using text data. In such example, it may be beneficial for the clause text data 645, input to the clause classifier 650, to be text data.

The clause classifier 650 may alternatively be trained using word embeddings. In at least some embodiments, the training data for the clause classifier 650 may be generated using global vector (GloVe) embeddings, or some other art known embedding technique. In at least some other embodiments, a proprietary word embedding technique may be used. When training data is configured using a particular word embedding technique, it may be beneficial to process the clause text data 645 using the same word embedding technique, and use the clause classifier 650 to process the embedded clause text data.

While the foregoing describes, and FIG. 6 illustrates, implementation of a clause classifier 650 by the system 120/device 110, the present disclosure is not limited thereto. In at least some embodiments, the system 120/device 110 may implement a trained component configured to perform the processes herein with respect to the clause classifier 650. The trained component may include one or more machine learning models, including but not limited to, one or more neural networks, one or more probabilistic graphs, one or more decision trees, and others. In other embodiments, the trained component may include a rules-based engine, one or more statistical-based algorithms, one or more mapping functions, or other types of functions/algorithms to determine whether a natural language input is a complex or non-complex natural language input. In some embodiments, the trained component may be configured to perform binary classification, where the clause text data may be classified into one of two classes/categories (i.e. IC processing or information retrieval processing). In some embodiments, the trained component may be configured to perform multiclass or multinomial classification, where the clause text data may be classified into one of three or more classes/categories. In some embodiments, the trained component may be configured to perform multi-label classification, where the clause text data may be associated with more than one class/category (i.e. both IC processing and information retrieval processing).

The clause classifier 650 processes the clause text data 645 to determine (908) a confidence score representing a likelihood that the clause text data is capable of being processed using IC processing or information retrieval processing. Thereafter, the clause classifier 650 may send (910) the clause text data 645 to the clause router 660 (of the complex natural language input component 275/575), may send (912) the node identifier to the clause router 660, and may send (914) the confidence score to the clause router 660. While FIG. 9A illustrates the clause classifier 650 sending the clause text data 645, the node identifier, and the confidence score to the clause router 660 as separate data transmissions, it will be appreciated that the clause classifier 650 may send the clause data text 645, the node identifier, and the confidence score to the clause router 660 as a single data transmission. The clause text data and confidence score are collectively illustrated as clause text data and classification indicator 655 in FIG. 6. It will be appreciated that a confidence score is merely an example classification indicator, and that other indicators of classification may be used.

The clause router 660 may determine, based on the confidence score, whether the clause text data is to be processed using IC processing, information retrieval processing, or both. For example, as described above, the clause classifier 650 may be trained using positive examples of non-complex natural language inputs capable of being processed using IC processing (and/or entities capable of being understood by the NLU component 260/560), and negative examples of non-complex natural language inputs capable of being processed using information retrieval processing (and/or entities capable of being understood by a component configured to perform information retrieval processing).

When the clause classifier 650 is trained as such, the clause router 660 may determine (1) the clause text data is to be processed using IC processing when the confidence score (output by the clause classifier 650) corresponds to a "high" range of confidence scores (e.g., confidence scores ranging from 0.67 to 1.0), (2) the clause text data is to be processed by an information retrieval component (such as the Q&A component 265/565 or a skill) when the confidence score (output by the clause classifier 650) corresponds to a "low" range of confidence scores (e.g., confidence score ranging from 0.0 to 0.33), and (3) the clause text data is to be processed by both an information retrieval component and an IC component 364 when the confidence score (output by the clause classifier 650) corresponds to a "middle" range of confidence scores (e.g., confidence score ranging from 0.34 to 0.66).

For further example, and as further described above, the clause classifier 650 may be trained using positive examples of non-complex natural language inputs capable of being processed using information retrieval processing (and/or entities capable of being understood by a component configured to perform information retrieval processing), and negative examples of non-complex natural language inputs capable of being processed using IC processing (and/or entities capable of being understood by the NLU component 260/560). When the clause classifier 650 is trained as such, the clause router 660 may determine (1) the clause text data is to be processed using information retrieval processing when the confidence score (output by the clause classifier 650) corresponds to a "high" range of confidence scores (e.g., confidence scores ranging from 0.67 to 1.0), (2) the clause text data is to be processed using IC processing when the confidence score (output by the clause classifier 650) corresponds to a "low" range of confidence scores (e.g., confidence score ranging from 0.0 to 0.33), and (3) the clause text data is to be processed using both information retrieval processing and IC processing when the confidence score (output by the clause classifier 650) corresponds to a "middle" range of confidence scores (e.g., confidence score ranging from 0.34 to 0.66).

Based on the clause router's foregoing processing, the clause router 660 sends (916) the clause text data 645 to the NLU component 260/560 and/or a component configured to perform information retrieval processing (such as the Q&A component 265/565 or a skill). The clause router 660 may also send the node identifier to the NLU component 260/560 and/or information retrieval component in the same or a different data transmission. In at least some embodiments, the clause router 660 may send the clause text data 645 (and node identifier) to the orchestrator component 230/LRO 528, and the orchestrator component 230/LRO 528 may send the clause text data 645 (and node identifier) to the NLU component 260/560 and/or information retrieval component.

The NLU component 260/560 (and more particularly an IC component(s) 364) may process received clause text data 645 (which may be text data or word embeddings data) as described herein above with respect to FIGS. 3-4. An information retrieval component may obtain data from a knowledge base, by performing an internet search, or by performing other information retrieval processing known in the art. For example, the Q&A component 265/565 may process received text data 645 (which may be text data or word embeddings data) as described herein above with respect to FIG. 2.

The clause router 660 may receive (1) an NLU hypothesis (and the node identifier) from the NLU component 260/560 (either directly or via the orchestrator component 230/LRO 528, and/or (2) entity data (and the node identifier) from an information retrieval component (either directly or via the orchestrator component 230/LRO 528). If the clause router 660 receives an NLU hypothesis, the clause router 660 sends (920) the NLU hypothesis to the graphing component 640. If the clause router 660 receives entity data, the clause router 660 sends (920) the entity data to the graphing component 640. If the clause router 660 receives an NLU hypothesis and entity data (e.g., based on IC processing being performed at least partially in parallel to information retrieval processing), the clause router 660 may determine a higher scoring confidence score between an NLU confidence score (associated with the NLU hypothesis) and an information retrieval confidence score (associated with the entity data), and may send (920) the data (i.e., the NLU hypothesis or the entity data) associated with the higher scoring confidence score. The NLU hypothesis and entity data are collectively referenced in FIG. 6 as 665.

The clause router 660 may also send (922) the node identifier to the graphing component 640. While FIG. 9B illustrates the clause router 660 sending the NLU hypothesis or entity data, and the node identifier, to the graphing component 640 in different data transmissions, it will be appreciated that the clause router 660 may send the NLU hypothesis or entity data, and the node identifier, to the graphing component 640 are a single data transmission.

The graphing component 640 may thereafter identify (924) second node data dependent on first node data corresponding to the node identifier. Using FIG. 8 as an example, the graphing component 640 may determine first node data corresponding to the node identifier adfds, determine the first node data is associated with the output connection identifier 5d5ds, determine connection data associated with the connection identifier 5d5d3, determine the connection data indicates an inputting node identifier of jkj, and therefrom determine second node data corresponding to the node identifier jkj. In essence, such processing by the graphing component 640 enables the graphing component 640 to determine a node dependent on the node with respect to which processing described above with respect to FIGS. 9A-9B has already been performed.

The graphing component 640 may generate updated second node data by replacing a variable, in the second node data, with an entity represented in the NLU hypothesis or entity data.

Applying the foregoing teachings of FIGS. 9A-9C to FIG. 8 as an example, the graphing component 640 may send, to the clause classifier 650, the clause text data "latest album by [artist name]" and the clause identifier adfds. The clause classifier 650 may process the clause text data to generate a confidence score. Thereafter, the clause classifier 650 may send, to the clause router 660, the clause text data "latest album by [artist name]," the clause identifier adfds, and the confidence score. The clause router 660 may determine the confidence score indicates the clause text data is likely capable of being processed using information retrieval processing. In response, the clause router 660 may send, to the Q&A component 265/565 (or component capable of performing information retrieval processing, such as a skill), the clause text data "latest album by [artist name]" and the clause identifier adfds. Thereafter, the clause router 660 may receive, from the Q&A component 265/565 (or other component capable of performing information retrieval processing, such as a skill), entity data corresponding to a latest album title. The clause router 660 may then send, to the graphing component 640, the entity data and the clause identifier adfds. The graphing component 640 may determine first node data corresponding to the node identifier adfds, determine the first node data is associated with the output connection identifier 5d5ds, determine connection data associated with the connection identifier 5d5d3, determine the connection data indicates an inputting node identifier of jkj, and therefrom determine second node data corresponding to the node identifier jkj. The graphing component 640 may then generate updated second node data by replacing "latest album," in the second node data value "title song of latest album," with "[album title]," resulting in the updated second node data having a value of "title song of [album title]."

The processes of steps 902-926 may be repeated with respect to each node in the execution graph of a complex natural language input, until the graphing component 640 determines (928) updated clause text data, to be processed, corresponds to node data without any dependencies. In other words, processing steps 902-926 may be repeated until the graphing component 640 determines a node, to be processed, is a last node of the execution graph (without any further dependent nodes). Examples of such "last nodes" include node 12365 in FIG. 7, and node gf55 in FIG. 8. In at least some embodiments, the graphing component 640 may determine node data (to be processed) does not have any dependencies based on the node data not include an output connection identifier(s).

After determining the updated clause text data to be processed corresponds to node data without any dependencies, the graphing component 640 may send (930) the updated clause text data to the clause classifier 650. The graphing component 640 may also send (932) the node identifier (corresponding to the updated clause text data) to the clause classifier 650, as well as send (934), to the clause classifier, a last node indicator that the updated clause text data corresponds to node data without any dependencies. While FIG. 9C illustrates the graphing component 640 sending the updated clause text data, the node identifier, and the last node indicator to the clause classifier 650 in separate data transmissions, it will be appreciated that the graphing component 640 may send the updated clause text data, the node identifier, and the last node indicator to the clause classifier 650 as part of a single data transmission.

The clause classifier 650 may process the updated clause text data to determine (936) a confidence score representing a likelihood that the updated clause text data is capable of being processed using IC processing or information retrieval processing. Based on the clause classifier 650 receiving the last node indicator representing the updated clause text data corresponds to node data without any dependencies, rather than sending the confidence score to the clause router 660, the clause classifier 650 may send (938) the confidence score to the graphing component 640, as well as send (940) the node identifier to the graphing component 640. While FIG. 9D illustrates the clause classifier 650 sending the confidence score and the node identifier to the graphing component 640 in separate data transmissions, it will be appreciated that the clause classifier 650 may send the confidence score and the node identifier to the graphing component 640 as part of a single data transmission.

Based on the confidence score, the graphing component 640 may determine (942) the updated clause text data is to be processed using IC processing and/or information retrieval processing. For example, as described above, the clause classifier 650 may be trained using positive examples of non-complex natural language inputs capable of being processed using IC processing (and/or entities capable of being understood by the NLU component 260/560), and negative examples of non-complex natural language inputs capable of being processed using information retrieval processing (and/or entities capable of being understood by the Q&A component 265/565, a skill, etc.). When the clause classifier 650 is trained as such, the graphing component 640 may determine (1) the updated clause text data is to be processed using IC processing when the confidence score (output by the clause classifier 650) corresponds to a "high" range of confidence scores (e.g., confidence scores ranging from 0.67 to 1.0), (2) the updated clause text data is to be processed using information retrieval processing when the confidence score (output by the clause classifier 650) corresponds to a "low" range of confidence scores (e.g., confidence score ranging from 0.0 to 0.33), and (3) the updated clause text data is to be processed using both IC processing and information retrieval processing when the confidence score (output by the clause classifier 650) corresponds to a "middle" range of confidence scores (e.g., confidence score ranging from 0.34 to 0.66).

For further example, and as further described above, the clause classifier 650 may be trained using positive examples of non-complex natural language inputs capable of being processed using information retrieval processing (and/or entities capable of being understood by the Q&A component 265/565, a skill, etc.), and negative examples of non-complex natural language inputs capable of being processed using IC processing (and/or entities capable of being understood by the NLU component 260/560). When the clause classifier 650 is trained as such, the graphing component 640 may determine (1) the updated clause text data is to be processed using information retrieval processing when the confidence score (output by the clause classifier 650) corresponds to a "high" range of confidence scores (e.g., confidence scores ranging from 0.67 to 1.0), (2) the updated clause text data is to be processed using IC processing when the confidence score (output by the clause classifier 650) corresponds to a "low" range of confidence scores (e.g., confidence score ranging from 0.0 to 0.33), and (3) the updated clause text data is to be processed using both information retrieval processing and the IC processing when the confidence score (output by the clause classifier 650) corresponds to a "middle" range of confidence scores (e.g., confidence score ranging from 0.34 to 0.66).

For example, with respect to the last node 23526 of FIG. 7, the graphing component 640 may determine the confidence score (output by the clause classifier 650) indicates updated clause text data (of the node 23526) is to be processed using IC processing (as the updated clause text data corresponds to a transactional query). For further example, with respect to the last node gf55 of FIG. 8, the graphing component 640 may determine the confidence score (output by the clause classifier 650) indicates updated clause text data (of the node gf55) is to be processed using information retrieval processing (as the updated clause text data corresponds to an informational query).

The graphing component 640 may output (944) the updated clause text data and an indicator representing the updated clause text data is to be processed using IC processing and/or information retrieval processing. In at least some embodiments, the graphing component 640 may output the updated clause text data and the indicator to the orchestrator component 230/LRO 528. If the indicator represents the updated clause text data is to be processed using IC processing, the updated clause text data may be sent to the NLU component 260/560 (for example via the orchestrator component 230/LRO 528) for processing directed to performing an action responsive to the complex natural language input (as opposed to processing to generate data for updating a dependent node of the execution graph). If the indicator represents the updated clause text data is to be processed using information retrieval processing, the updated clause text data may be sent to the Q&A component 265/565, a skill, etc. (for example via the orchestrator component 230/LRO 528) for processing directed to identifying information responsive to the complex natural language input. If the indicator represents the updated clause text data is to be processed using IC processing and information retrieval processing, the updated clause text data may be sent to the NLU component 260/560 and the Q&A component 265/565 (and/or a skill) (for example via the orchestrator component 230/LRO 528) for processing directed to performing an action responsive to the complex natural language input (as opposed to processing to generate data for updating a dependent node of the execution graph).

The foregoing describes embodiments in which the graphing component 640 may cause IC processing and/or information retrieval processing to be performed, with respect to a last node, for the purpose of performing an action responsive to a complex natural language input. The following describes further embodiments in which the clause router 660 may cause IC processing and/or information retrieval processing to be performed, with respect to a last node, for the purpose of performing an action responsive to a complex natural language input.

Figure 10:
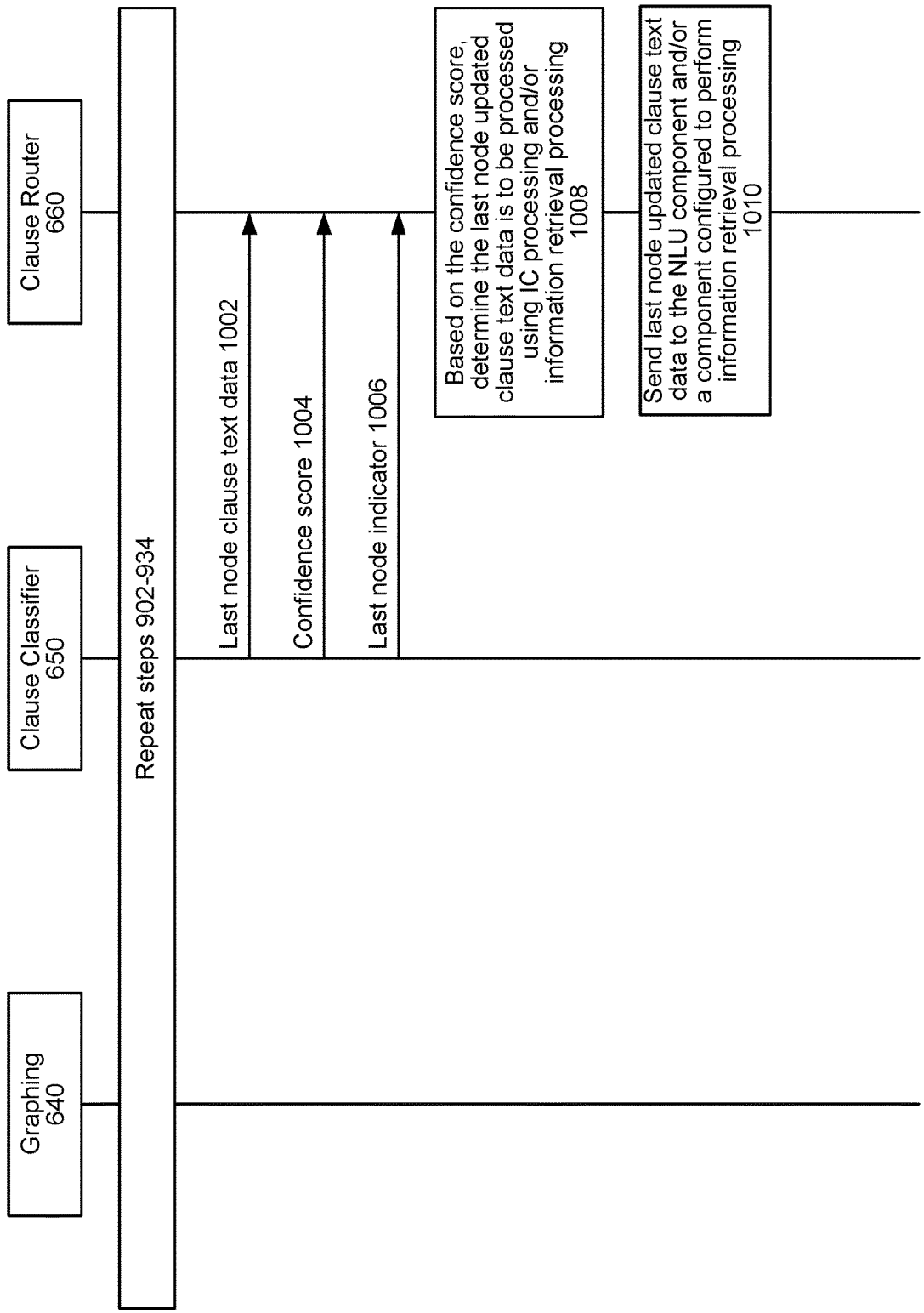
FIG. 10 is a signal flow diagram illustrating example runtime processes of components of a complex natural language input component, according to embodiments of the present disclosure.

As illustrated in FIG. 10, the complex natural language input component 275/575 may perform processing as described above with respect to steps 902-934 of FIGS. 9A-9C. Thereafter, whereas the clause classifier 650 sends the confidence score and node identifier to the graphing component 640 in FIG. 9D, in FIG. 10 the clause classifier 650 sends (1002) the clause text data to the clause router 660, sends (1004) the confidence score to the clause router 660, and sends (1006) the last node indicator (representing the updated clause text data corresponds to a node without dependencies) to the clause router 660. While FIG. 10 illustrates the clause classifier 650 sending the confidence score and the last node indicator to the clause router 660 in separate data transmissions, it will be appreciated that the clause classifier 650 may send the confidence score and the node indicator to the graphing component 640 as part of a single data transmission.

Based on the confidence score, the clause router 660 may determine (1008) the updated clause text data is to be processed using IC processing and/or information retrieval processing. For example, as described above, the clause classifier 650 may be trained using positive examples of non-complex natural language inputs capable of being processed using IC processing (and/or entities capable of being understood by the NLU component 260/560), and negative examples of non-complex natural language inputs capable of being processed using information retrieval processing (and/or entities capable of being understood by the Q&A component 265/565, a skill, etc.). When the clause classifier 650 is trained as such, the clause router 660 may determine (1) the updated clause text data is to be processed using IC processing when the confidence score (output by the clause classifier 650) corresponds to a "high" range of confidence scores (e.g., confidence scores ranging from 0.67 to 1.0), (2) the updated clause text data is to be processed using information retrieval processing when the confidence score (output by the clause classifier 650) corresponds to a "low" range of confidence scores (e.g., confidence score ranging from 0.0 to 0.33), and (3) the updated clause text data is to be processed using both IC processing and information retrieval processing when the confidence score (output by the clause classifier 650) corresponds to a "middle" range of confidence scores (e.g., confidence score ranging from 0.34 to 0.66).

For further example, and as further described above, the clause classifier 650 may be trained using positive examples of non-complex natural language inputs capable of being processed using information retrieval processing (and/or entities capable of being understood by the Q&A component 265/565, a skill, etc.), and negative examples of non-complex natural language inputs capable of being processed using IC processing (and/or entities capable of being understood by the NLU component 260/560). When the clause classifier 650 is trained as such, the clause router 660 may determine (1) the updated clause text data is to be processed using information retrieval processing when the confidence score (output by the clause classifier 650) corresponds to a "high" range of confidence scores (e.g., confidence scores ranging from 0.67 to 1.0), (2) the updated clause text data is to be processed using IC processing when the confidence score (output by the clause classifier 650) corresponds to a "low" range of confidence scores (e.g., confidence score ranging from 0.0 to 0.33), and (3) the updated clause text data is to be processed using both information retrieval processing and the IC processing when the confidence score (output by the clause classifier 650) corresponds to a "middle" range of confidence scores (e.g., confidence score ranging from 0.34 to 0.66).

Based on the clause router 660 receiving the last node indicator, the clause router 660 may send (1010) the updated clause text data to the NLU component 260/560 and/or a component configured to perform information retrieval processing (such as the Q&A component 265/565 or a skill). If the clause router 660 determines the confidence score represents the updated clause text data is to be processed using IC processing, the clause router 660 may send the updated clause text data to the NLU component 260/560 with an indicator to process for the purpose of performing an action responsive to the complex natural language input (as opposed to processing to generate an NLU hypothesis for transmission back to the clause router 660). If the clause router 660 determines the confidence score represents the updated clause text data is to be processed using information retrieval processing, the clause router 660 may send the updated clause text data to the Q&A component 265/565 (or another component such as a skill) with an indicator to determine information responsive to the complex natural language input (as opposed to determining entity data for transmission back to the clause router 660). If the clause router 660 determines the confidence score represents the updated clause text data is to be processed using IC processing and information retrieval processing, the clause router 660 may send the updated clause text data to the NLU component 260/560 and the Q&A component 265/565 (or another component configured to perform information retrieval processing, such as a skill) with an indicator to process for the purpose of responding to the complex natural language input (as opposed to processing to generate data for transmission back to the clause router 660).

Figure 11:
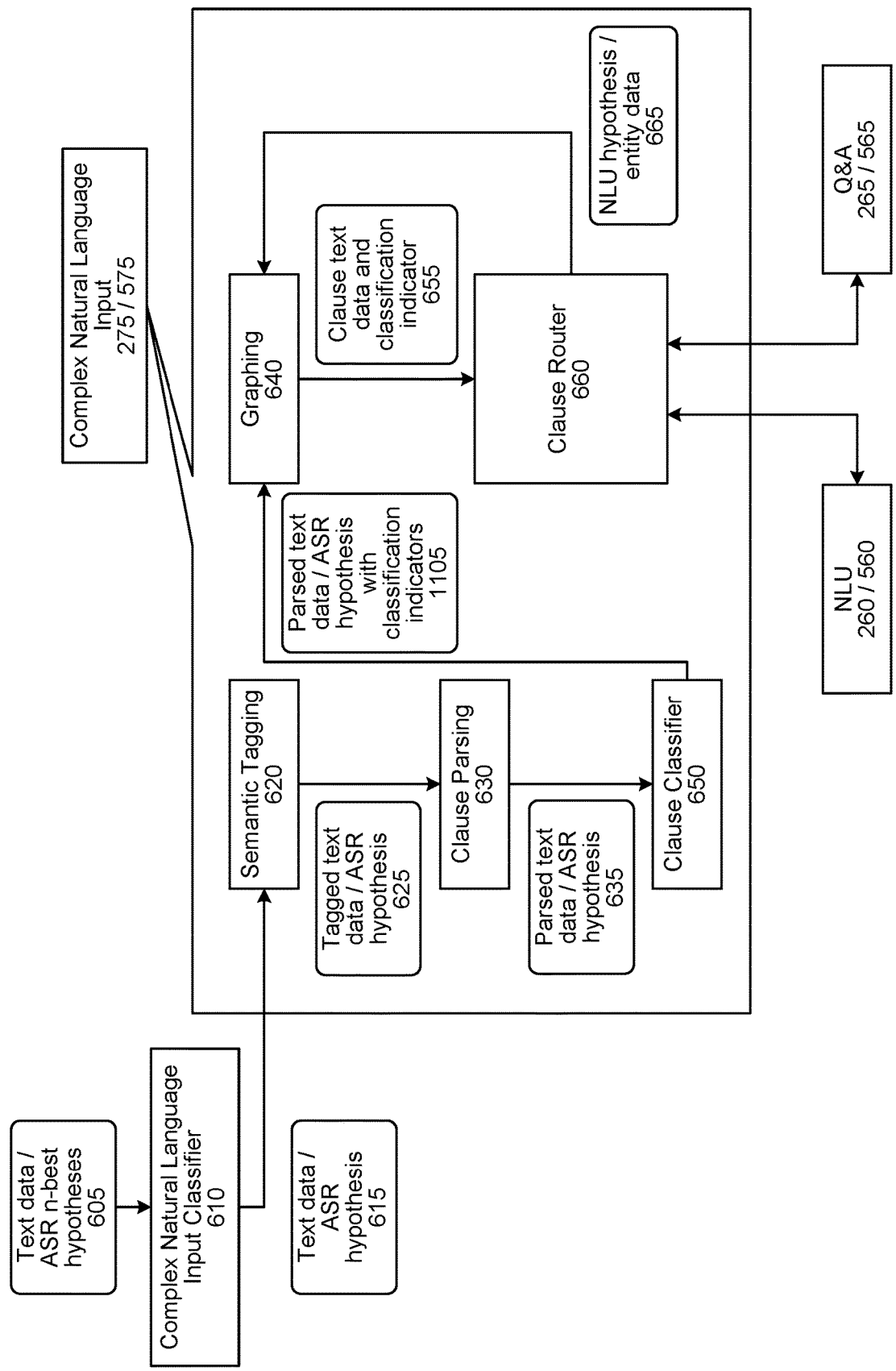
FIG. 11 is a conceptual diagram illustrating processing performable by a complex natural language input component, according to embodiments of the present disclosure.

FIG. 11 shows an alternative configuration of the complex natural language input component 275/575 from that illustrated in FIG. 6. As illustrated in FIG. 11, instead of sending the parsed text data/ASR hypothesis 635 to the graphing component 640 (as illustrated in FIG. 6), the clause parsing component 630 may send the parsed text data/ASR hypothesis 635 to the clause classifier 650.

The clause classifier 650 may process (as described herein above) with respect to each clause indicated in the parsed text data/ASR hypothesis 635. In at least some embodiments, the clause classifier 650 may process the different clauses in series. In at least some other embodiments, the clause classifier 650 may process the clauses at least partially in parallel. The clause classifier may send, to the graphing component 640, the data 1105 including the parsed text data/ASR hypothesis and classification indicators.

The graphing component 640 may process (as described herein above) to generate an execution graph, whereby each node corresponds to a different clause associated with its respective confidence score generated by the clause classifier 650. The graphing component 640 may send data 655 (corresponding to clause text and a classification indicator, such as a confidence score generated by the clause classifier 650 for the clause text data) to the clause router 660.

The clause router 660 may process (as described herein above) to receive an NLU hypothesis or entity data 665, which the clause router 660 may send to the graphing component 640. The graphing component 640 may then process (as described herein above) to update clause text data. After generating the updated clause text data, since all clauses were processed by the clause classifier 650 prior to generation of the execution graph with respect to FIG. 11, the graphing component 640 may send the updated clause text data and associated classification indicator to the clause router 660. This process may repeat until a last clause of the execution graph is processed (as described herein above).

In at least some instances, the graphing component 640 may generate an execution graph that represents a complex natural language input and that include multiple nodes that are not dependent on one or more other nodes. For example, as illustrated in FIG. 12, the graphing component 640 may generate an execution graph in which a node di89 (corresponding to a first clause of a complex natural language input) is dependent from a node 5647856 (corresponding to a second clause of the complex natural language input) and a node kddd (corresponding to a third clause of the complex natural language input).

In the scenario of FIG. 12, the complex natural language input component 275/575 may perform (1202) processing with respect to the node 5647856. At least partially in parallel to perform processing with respect to the node 5647856, the complex natural language input component 275/575 may perform (1204) processing with respect to the node kdd.

As processing of different nodes is being performed in parallel, the complex natural language input component 275/575 may generate (1206) updated clause text data, for the node di89 as processing of the nodes 5647856 and kddd is completed. For example, the node di89 may initially be configured with clause text data comprising a first variable to be replaced with a first entity output from processing of the node 5647856, and a second variable to be replaced with a second entity output from processing of the node kddd. If the complex natural language input component 275/575 completes processing of the node 5647856 prior to completing processing of the node kddd, the complex natural language input component 275/575 may generate first updated clause text data for the node di89 that includes the first entity and the second variable and, upon completing processing of the node kddd, the complex natural language input component 275/575 may generate second updated clause text data for the node di89 that includes the first entity and the second entity. Conversely, if the complex natural language input component 275/575 completes processing of the node kddd prior to completing processing of the node 5647856, the complex natural language input component 275/575 may generate first updated clause text data for the node di89 that includes the first variable and the second entity and, upon completing processing of the node 5647856, the complex natural language input component 275/575 may generate second updated clause text data for the node di89 that includes the first entity and the second entity. By processing independent nodes at least partially in parallel, user-perceived latency may be reduced.

While FIG. 12 shows an example of processing two nodes at least partially in parallel, the present disclosure is not limited thereto. That is, the present disclosure envisions the parallel processing of two or more nodes of a single execution graph.

Figure 13:
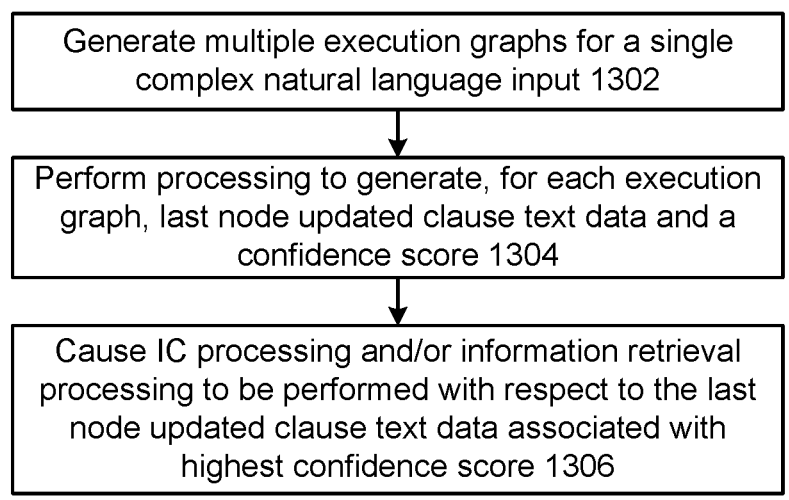
FIG. 13 is a process flow diagram illustrating runtime processing that may be performed when multiple execution graphs are generated for a single complex natural language input, according to embodiments of the present disclosure.

The foregoing describes how the complex natural language input component 275/575 may generate and process a single execution graph for a complex natural language input. In at least some instances and as illustrated in FIG. 13, the complex natural language input component 275/575 (and more particularly the graphing component 640) may generate (1302) multiple execution graphs for a single complex natural language input. When this occurs, the complex natural language input component 275/575 may perform (1304) processing to generate, for each execution graph, last node updated clause text data and a confidence score representing a confidence that the corresponding execution graph correctly represents the complex natural language input. In at least some embodiments, the complex natural language input component 275/575 may performing processing, with respect to multiple execution graphs corresponding to the same complex natural language input, in parallel or at least partially in parallel. In at least some embodiments, the overall confidence score of an execution graph may be generated based on the NLU confidence scores and information retrieval confidence scores corresponding to the different nodes of the execution graph. The complex natural language input component 275/575 may cause (1306) IC processing and/or information retrieval processing to be performed with respect to the last node updated clause text data associated with the highest execution graph confidence score.

In at least some situations, when the complex natural language input component 275/575 generates multiple execution graphs for a single complex natural language input, a clause (of the complex natural language input determined by the clause parsing component 630) may be shared between two or more of the execution graphs. In such instances, once a first instance of processing of the clause (with respect to one execution graph) is completed, the complex natural language input component 275/575 may simply re-use the processing result with respect to the other execution graphs including the same clause, rather than re-performing the same processing with respect to the other execution graphs.

In at least some situations, a complex natural language input may be a multi-intent natural language input. An example of such an input is "turn on the kitchen light and play my favorite music," in which "turn on the kitchen light" may correspond to a "turn on light" intent, and "play my favorite music" may correspond to a "play music" intent. With respect to such a complex natural language input, the complex natural language input component 275/575 may generate an execution graph including two different "last nodes" (e.g., one corresponding to a clause corresponding to the "turn on light" intent, and one corresponding to a clause corresponding to the "play music" intent).

Moreover, the complex natural language input component 275/575 may generate a multi-last node execution graph in which the last nodes do not both correspond to intents. For example, for the complex natural language input "turn on the kitchen light and tell me who won the soccer game today," the complex natural language input component 275/575 may generate an execution graph including a first last node corresponding to a clause corresponding to the "turn on light" intent, and a second last node corresponding to a clause to output information about a recent soccer game.

When the complex natural language input component 275/575 generates an execution graph with multiple last nodes, the complex natural language input component 275/575 may process dependencies of the different last nodes in parallel to the extent possible, and re-using processing results to the extent clauses are duplicated among nodes of the execution graph.

As described herein, the system 120/device 110 may implement a complex natural language input classifier 610 such that the complex natural language input component 275/575 only processes with natural language inputs determined to be complex. In at least some embodiments, the system 120/device 110 may not implement the complex natural language input classifier 610. In such embodiments, text data/a top-scoring ASR hypothesis off all natural language inputs may be input to the complex natural language input component 275/575. Moreover, in such embodiments, if the text data/top-scoring ASR hypothesis (input to the complex natural language input component 275/575) corresponds to a non-complex natural language input, the clause parsing component 630 may generate data 635 representing a single clause (i.e., corresponding to an entirety of the non-complex natural language input, the graphing component 640 may generate an execution graph including a single node and no connections, and the complex natural language input component 275/575 may simply process the execution graph as if the single node is a last node with updated clause text data (as described herein above with respect to FIGS. 9C-10).

As described herein above, the complex natural language input component 275/575 may implement an execution graph-based approach. In at least some embodiments, the complex natural language input component 275/575 may instead implement an artificial neural network based approach. For example, the complex natural language input component 275/575 may use a deep learning architecture, such as Bidirectional Encoder Representations from Transformers (BERT), to encode data (such as the text data/ASR hypothesis 615, the tagged text data/ASR hypothesis 625, the parsed text data/ASR hypothesis 635, and the clause text data 645) prior to transmission of the data. In such an approach, knowledge is implicitly represented as semantic concepts using low-dimensional continuous vectors.

In at least some embodiments, the complex natural language input component 275/575 may implement a hybrid approach that leverages execution graphs, intent/slot-based NLU processing, and embedding-based systems.

Figure 14:
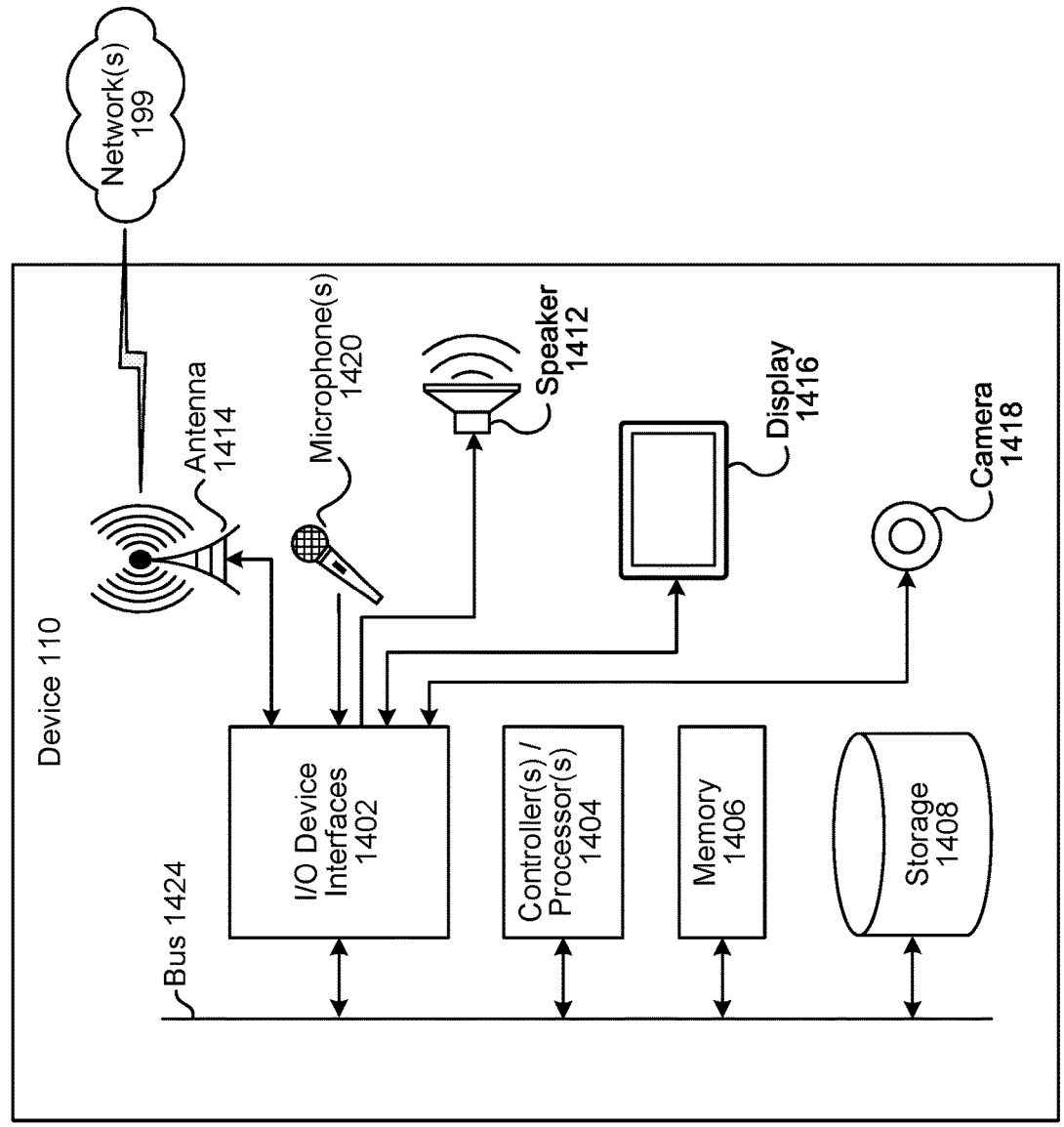
FIG. 14 is a block diagram conceptually illustrating example components of a device, according to embodiments of the present disclosure.
Figure 15:
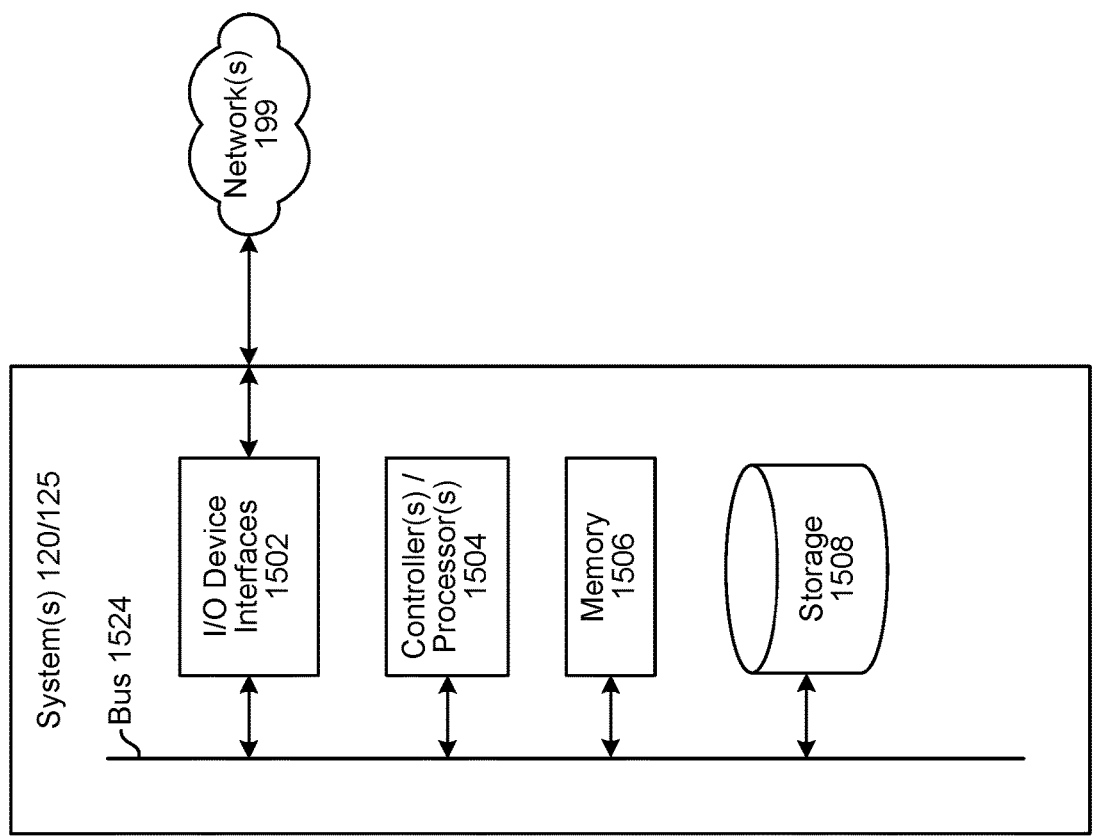
FIG. 15 is a block diagram conceptually illustrating example components of a system, according to embodiments of the present disclosure.

FIG. 14 is a block diagram conceptually illustrating example components of a device 110 according to the present disclosure. FIG. 15 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1402/1502).

Computer instructions for operating each device (110/120/125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/125) includes input/output device interfaces (1402/1502). A variety of components may be connected through the input/output device interfaces (1402/1502), as will be discussed further below. Additionally, each device (110/120/125) may include an address/data bus (1424/1524) for conveying data among components of the respective device. Each component within a device (110/120/125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device 110, the system 120, and/or a skill component 125 may include their own dedicated processors, memory, and/or storage. Alternatively, one or more of the components of the device 110, the system 120, and/or a skill component 125 may utilize the I/O interfaces (1402/1502), processor(s) (1404/1504), memory (1406/1506), and/or storage (1408/1508) of the device(s) 110, system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill component 125, as described herein, are illustrative, and may be located as a stand-alone device or may be included, in whole or in part, as a component of a larger device or system.

Figure 16:
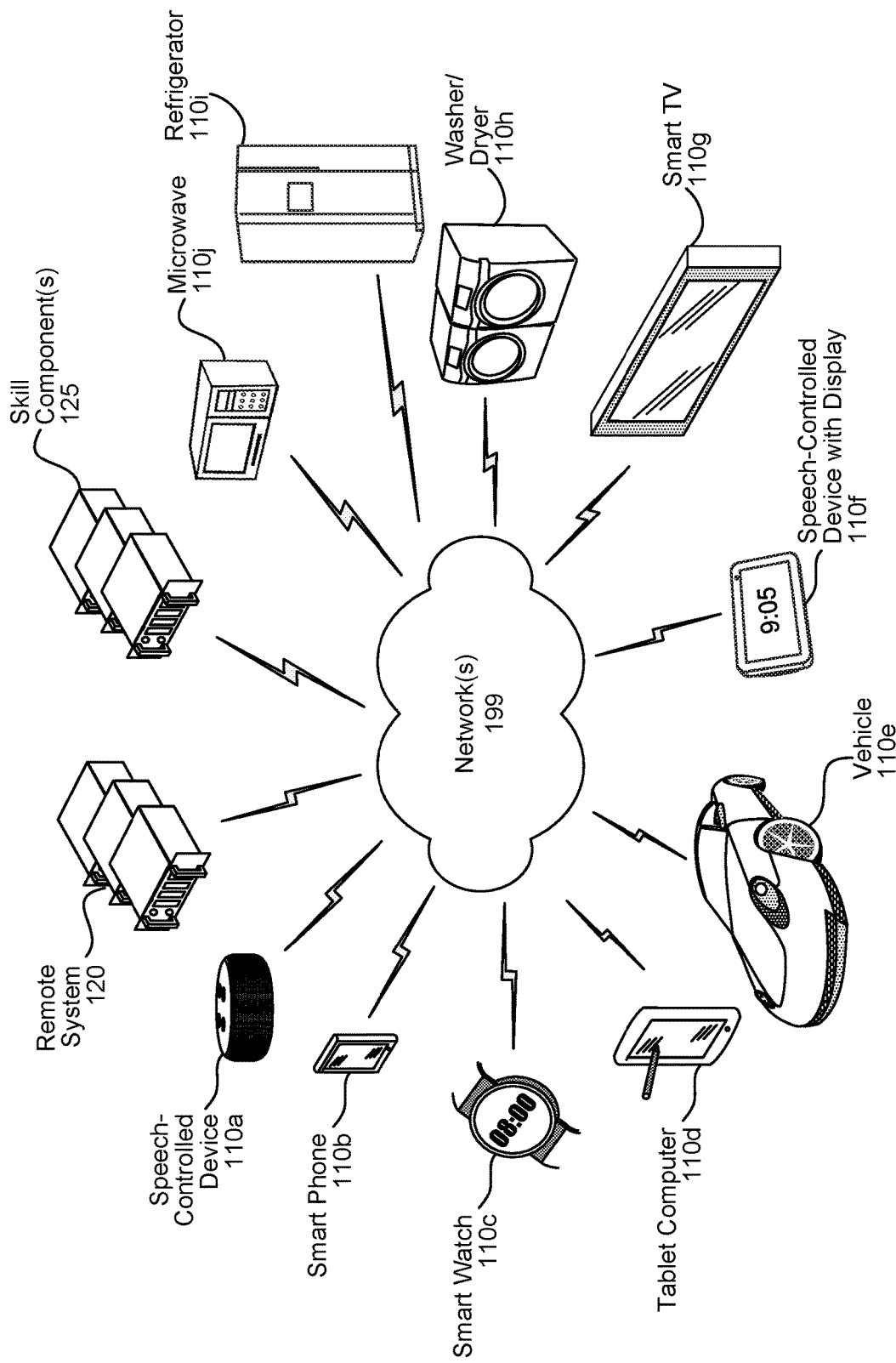
FIG. 16 illustrates an example of a computer network for use with the overall system, according to embodiments of the present disclosure.

As illustrated in FIG. 16, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a first spoken natural language input;
performing automatic speech recognition (ASR) processing on the first audio data to generate first ASR output data;
using a first trained classifier, determining:
intent classification (IC) processing of the first ASR output data will result in a first error condition, and
processing of the first ASR output data, using information retrieval processing, will result in a second error condition;
in response to determining processing of the first ASR output data will result in the first error condition and the second error condition, generating:
first clause data corresponding to a first clause represented in the first ASR output data, the first clause data comprising a first variable, and
second clause data corresponding to a second clause represented in the first ASR output data, the second clause data including a first entity indicated in the first ASR output data;
using a second trained classifier, determining:
the first clause data is to be processed using IC processing, and
the second clause data is to be processed using information retrieval processing;
performing information retrieval processing to:
determine the first entity corresponds to a first entity identifier, and
in response to determining the first entity corresponds to the first entity identifier, determine the first variable corresponds to a second entity;
generating updated first clause data by replacing the first variable, in the first clause data, with the second entity;
performing IC processing on the updated first clause data to determine first intent data corresponding to a first processing component; and
causing the first processing component to process the first intent data to perform an action responsive to the first spoken natural language input.

2. The computer-implemented method of claim 1, further comprising:
in response to determining processing of the first ASR output data will result in the first error condition and the second error condition:
associating a first portion of the first ASR output data with a first semantic tag, the first portion corresponding to a first word, the first semantic tag representing the first word corresponds to a first word type, and
associating a second portion of the first ASR output data with a second semantic tag, the second portion corresponding to a second word, the second semantic tag representing the second word corresponds to a second word type;
based at least in part on the first semantic tag being associated with the first portion, generating the first clause data to represent the first portion; and
based at least in part on the second semantic tag being associated with the second portion, generating the second clause data to represent the second portion.

3. The computer-implemented method of claim 1, further comprising:
generating a graph representation corresponding to the first spoken natural language input, the graph representation comprising:
first node data corresponding to the first clause data,
second node data corresponding to the second clause data, and
connection data representing a result of processing of the second node data is to be used to update the first node data; and
in response to determining the first variable corresponds to a second entity, generating updated first node data by replacing the first variable, in the first node data, with the second entity.

4. The computer-implemented method of claim 1, further comprising:
in response to determining processing of the first ASR output data will result in the first error condition and the second error condition, generating third clause data corresponding to a third clause represented in the first ASR output data;
using the second trained classifier, determining the third clause data is to be processed using at least one of information retrieval processing or IC processing; and
at least partially in parallel:
performing information retrieval processing with respect to the third clause data; and
performing IC processing on the third clause data.

5. A computer-implemented method comprising:
receiving first data representing a first natural language input;
determining the first natural language input corresponds to a plurality of commands;
generating second data corresponding to a first portion of the first natural language input, the second data comprising a first variable;
generating third data corresponding to a second portion of the first natural language input, the third data representing the first variable is dependent on resolution of at least a first entity indicated in the first natural language input;
using at least one of information retrieval processing or intent classification (IC) processing, processing the third data to determine the first variable corresponds to a second entity;
generating updated second data by replacing the first variable, in the second data, with the second entity; and
using at least one of information retrieval processing or IC processing, processing the updated second data to determine output data responsive to the first natural language input.

6. The computer-implemented method of claim 5, further comprising:
associating a first portion of the first data with a first semantic tag, the first portion corresponding to a first word; and
generating the second data based at least in part on the first semantic tag being associated with the first portion of the first data.

7. The computer-implemented method of claim 5, further comprising:
generating a graph representation comprising:
first node data corresponding to the second data,
second node data corresponding to the third data, and
connection data representing a result of processing of the second node data is to be used to update the first node data; and in response to determining the first variable corresponds to the second entity, generating updated first node data by replacing the first variable, in the first node data, with the second entity.

8. The computer-implemented method of claim 5, wherein:
processing of the third data comprises processing the third data using information retrieval processing; and
processing of the updated second data comprises processing the updated second data using IC processing.

9. The computer-implemented method of claim 5, further comprising using a trained component to determine the third data is capable of being processed using at least one of information retrieval processing or IC processing, the trained component being configured using:
fourth data corresponding to at least a second natural language input capable of being processed using information retrieval processing; and
fifth data corresponding to at least a third natural language input capable of being processed using IC processing.

10. The computer-implemented method of claim 5, wherein the first data is first audio data representing a first spoken natural language input, and wherein the computer-implemented method further comprises:
performing automatic speech recognition (ASR) processing on the first audio data to generate first ASR output data representing a plurality of ASR hypotheses, the plurality of ASR hypotheses comprising a first ASR hypothesis;
inputting the plurality of ASR hypotheses to a trained component to determine the first natural language input corresponds to the plurality of commands; and
using the first ASR hypothesis to generate the second data and the third data.

11. The computer-implemented method of claim 5, further comprising:
generating fourth data corresponding to a third portion of the first natural language input, the fourth data representing the first variable is dependent on resolution of at least a third entity indicated in the first natural language input; and
at least partially in parallel:
processing the third data using at least one of information retrieval processing or IC processing, and
processing the fourth data using at least one of information retrieval processing or IC processing.

12. The computer-implemented method of claim 5, wherein determining the first natural language input corresponds to the plurality of commands comprises determining that IC processing of the first data is likely to result in a confidence score failing to satisfy a threshold condition.

13. A computing system, comprising:
at least one processor; and
at least one memory comprising instructions that, when executed by the at least one processor, cause the computing system to:
receive first data representing a first natural language input;
determine the first natural language input corresponds to a plurality of commands;
generate second data corresponding to a first portion of the first natural language input, the second data comprising a first variable;
generate third data corresponding to a second portion of the first natural language input, the third data representing the first variable is dependent on resolution of at least a first entity indicated in the first natural language input;
using at least one of information retrieval processing or intent classification (IC) processing, process the third data to determine the first variable corresponds to a second entity;
generate updated second data by replacing the first variable, in the second data, with the second entity; and
using at least one of information retrieval processing or IC processing, process the updated second data to determine output data responsive to the first natural language input.

14. The computing system of claim 13, wherein the at least one memory further comprising instructions that, when executed by the at least one processor, further cause the computing system to:
associate a first portion of the first data with a first semantic tag, the first portion corresponding to a first word; and
generate the second data based at least in part on the first semantic tag being associated with the first portion of the first data.

15. The computing system of claim 13, wherein the at least one memory further comprising instructions that, when executed by the at least one processor, further cause the computing system to:
generate a graph representation comprising:
first node data corresponding to the second data,
second node data corresponding to the third data, and
connection data representing a result of processing of the second node data is to be used to update the first node data; and
in response to determining the first variable corresponds to the second entity, generate updated first node data by replacing the first variable, in the first node data, with the second entity.

16. The computing system of claim 13, wherein:
the instructions to process the third data further comprise instructions that, when executed by the at least one processor, further cause the computing system to process the third data using information retrieval processing; and
the instructions to process the updated second data further comprise instructions that, when executed by the at least one processor, further cause the computing system to process the updated second data using IC processing.

17. The computing system of claim 13, wherein the at least one memory further comprising instructions that, when executed by the at least one processor, further cause the computing system to:
use a trained component to determine the third data is capable of being processed using at least one of information retrieval processing or IC processing, the trained component being configured using:
fourth data corresponding to at least a second natural language input capable of being processed using information retrieval processing, and
fifth data corresponding to at least a third natural language input capable of being processed using IC processing.

18. The computing system of claim 13, wherein the first data is first audio data representing a first spoken natural language input, and wherein the at least one memory further comprising instructions that, when executed by the at least one processor, further cause the computing system to:

perform automatic speech recognition (ASR) processing on the first audio data to generate first ASR output data representing a plurality of ASR hypotheses, the plurality of ASR hypotheses comprising a first ASR hypothesis;

input the plurality of ASR hypotheses to a trained component to determine the first natural language input corresponds to the plurality of commands; and use the first ASR hypothesis to generate the second data and the third data.

19. The computing system of claim 13, wherein the at least one memory further comprising instructions that, when executed by the at least one processor, further cause the computing system to:

generate fourth data corresponding to a third portion of the first natural language input, the fourth data representing the first variable is dependent on resolution of at least a third entity indicated in the first natural language input; and at least partially in parallel:
  process the third data using at least one of information retrieval processing or IC processing, and
  process the fourth data using at least one of information retrieval processing or IC processing.

20. The computing system of claim 13, wherein the instructions to determine the first natural language input corresponds to the plurality of commands further comprise instructions that, when executed by the at least one processor, further cause the computing system to determine that IC processing of the first data is likely to result in a confidence score failing to satisfy a threshold condition.

* * * * *